(12) United States Patent
Trusov et al.

(10) Patent No.: US 10,648,811 B2
(45) Date of Patent: May 12, 2020

(54) VIBRATING-MASS GYROSCOPE SYSTEM

(71) Applicants: Alexander A. Trusov, Studio City, CA (US); Youngmin Albert Choi, Agoura Hills, CA (US); David Dexter Lynch, Santa Barbara, CA (US)

(72) Inventors: Alexander A. Trusov, Studio City, CA (US); Youngmin Albert Choi, Agoura Hills, CA (US); David Dexter Lynch, Santa Barbara, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 290 days.

(21) Appl. No.: 15/829,549

(22) Filed: Dec. 1, 2017

(65) Prior Publication Data
US 2019/0170514 A1     Jun. 6, 2019

(51) Int. Cl.
*G01C 19/5726* (2012.01)
*G01C 25/00* (2006.01)
(Continued)

(52) U.S. Cl.
CPC ....... *G01C 19/5726* (2013.01); *G01C 19/574* (2013.01); *G01C 19/5755* (2013.01);
(Continued)

(58) Field of Classification Search
CPC ...... G01P 15/18; G01P 15/131; G01P 15/097; G01P 15/13; G01P 15/132; G01P 2015/084
See application file for complete search history.

(56) References Cited

U.S. PATENT DOCUMENTS 3,382,724 A * 5/1968 Wilcox ................... G01P 15/18
                                                73/514.29
4,179,087 A * 12/1979 Johnson ................. G01C 19/28
                                                244/175

(Continued)

FOREIGN PATENT DOCUMENTS

JP     2016031366 A     3/2016
JP     2016164550 A     9/2016

OTHER PUBLICATIONS

Japanese Office Action for Application No. 2018-222418 dated Dec. 17, 2019.

*Primary Examiner* — David A Rogers
(74) *Attorney, Agent, or Firm* — Tarolli, Sundheim, Covell & Tummino LLP

(57) ABSTRACT

One embodiment includes a gyroscope system. The system includes a sensor system comprising a vibrating-mass and electrodes each arranged to provide one of a driving force and a force-rebalance to the vibrating-mass in each of three orthogonal axes. The system also includes a gyroscope controller that generates a drive signal provided to a first electrode of the electrodes to provide the driving force to facilitate an in-plane periodic oscillatory motion of the vibrating-mass along a first axis of the three orthogonal axes. The gyroscope controller also generates a force-rebalance signal provided to each of a second electrode and a third electrode of the plurality of electrodes associated with a respective second axis and a respective third axis of the three orthogonal axes to calculate a rotation of the gyroscope system about the respective second axis and the respective third axis of the three orthogonal axes.

20 Claims, 9 Drawing Sheets

(51) Int. Cl.
*G01C 19/5755* (2012.01)
*G01C 19/574* (2012.01)
*G01P 15/18* (2013.01)
*G01P 15/13* (2006.01)

(52) U.S. Cl.
CPC .......... *G01C 25/005* (2013.01); *G01P 15/132* (2013.01); *G01P 15/18* (2013.01)

(56) References Cited

U.S. PATENT DOCUMENTS

| | | | | |
|---|---|---|---|---|
| 4,398,417 | A * | 8/1983 | Shutt | G01P 15/125 73/497 |
| 4,951,508 | A | 8/1990 | Loper, Jr. et al. | |
| 6,826,960 | B2 * | 12/2004 | Schaad | G01P 15/18 73/510 |
| 7,043,985 | B2 * | 5/2006 | Ayazi | G01C 19/5719 29/592.1 |
| 7,178,401 | B2 * | 2/2007 | Byrd | G01P 15/097 73/510 |
| 7,437,255 | B2 * | 10/2008 | Woodmansee | G01P 15/18 702/94 |
| 8,099,994 | B2 * | 1/2012 | Stachow | G01P 21/00 702/104 |
| 8,322,213 | B2 * | 12/2012 | Trusov | G01C 19/5747 73/504.12 |
| 9,217,756 | B2 * | 12/2015 | Simon | G01P 15/097 |
| 9,645,267 | B2 * | 5/2017 | Paros | G01V 1/18 |
| 9,702,897 | B2 * | 7/2017 | Stewart | G01P 15/125 |
| 9,810,535 | B2 * | 11/2017 | Trusov | G01C 19/5726 |
| 2002/0189350 | A1 | 12/2002 | Tu | |
| 2004/0025590 | A1 * | 2/2004 | Schaad | G01P 15/097 73/514.29 |
| 2006/0230829 | A1 * | 10/2006 | Byrd | G01P 15/097 73/510 |
| 2010/0313657 | A1 * | 12/2010 | Trusov | G01C 19/5719 73/504.16 |
| 2011/0290021 | A1 * | 12/2011 | Horning | G01C 19/5691 73/504.13 |
| 2012/0240679 | A1 * | 9/2012 | Netzer | G01P 15/125 73/514.32 |
| 2012/0265481 | A1 * | 10/2012 | Stewart | G01P 15/131 702/141 |
| 2013/0192365 | A1 | 8/2013 | Zhuang et al. | |
| 2014/0230520 | A1 * | 8/2014 | Bulatowicz | G01P 15/125 73/1.38 |
| 2014/0236522 | A1 * | 8/2014 | Bulatowicz | G01P 15/125 702/104 |
| 2014/0260615 | A1 * | 9/2014 | Simon | G01P 15/097 73/514.29 |
| 2016/0025493 | A1 * | 1/2016 | Stewart | G01C 19/5733 73/504.12 |
| 2016/0231118 | A1 * | 8/2016 | Trusov | G01C 19/5726 |
| 2016/0334441 | A1 * | 11/2016 | Tin | G01P 21/00 |
| 2016/0341552 | A1 * | 11/2016 | Kub | G01C 19/5684 |
| 2017/0023605 | A1 * | 1/2017 | Spivak | G01P 15/11 |
| 2017/0153267 | A1 * | 6/2017 | Townsend | G01P 15/125 |

* cited by examiner

500

502 — PROVIDE A DRIVE SIGNAL TO A FIRST ELECTRODE TO PROVIDE A DRIVING FORCE TO A VIBRATING-MASS ALONG A FIRST AXIS OF THE THREE ORTHOGONAL AXES DURING A FIRST TIME PERIOD

504 — PROVIDE A FIRST FORCE-REBALANCE SIGNAL TO A SECOND ELECTRODE TO PROVIDE A FIRST FORCE-REBALANCE TO THE VIBRATING-MASS IN A SECOND AXIS OF THE THREE ORTHOGONAL AXES DURING THE FIRST TIME PERIOD TO CALCULATE A ROTATION OF THE GYROSCOPE SYSTEM ABOUT THE SECOND AXIS BASED ON THE FIRST FORCE-REBALANCE SIGNAL

506 — PROVIDE A SECOND FORCE-REBALANCE SIGNAL TO A THIRD ELECTRODE TO PROVIDE A SECOND FORCE-REBALANCE TO THE VIBRATING-MASS IN A THIRD AXIS OF THE THREE ORTHOGONAL AXES DURING THE FIRST TIME PERIOD TO CALCULATE A ROTATION OF THE GYROSCOPE SYSTEM ABOUT THE THIRD AXIS BASED ON THE SECOND FORCE-REBALANCE SIGNAL

508 — PROVIDE THE DRIVE SIGNAL TO THE SECOND ELECTRODE TO PROVIDE THE DRIVING FORCE TO THE VIBRATING-MASS ALONG THE SECOND AXIS DURING A SECOND TIME PERIOD

510 — PROVIDE THE FIRST FORCE-REBALANCE SIGNAL TO THE FIRST ELECTRODE TO PROVIDE THE FIRST FORCE-REBALANCE TO THE VIBRATING-MASS IN THE FIRST AXIS DURING THE SECOND TIME PERIOD TO CALCULATE A ROTATION OF THE GYROSCOPE SYSTEM ABOUT THE FIRST AXIS BASED ON THE FIRST FORCE-REBALANCE SIGNAL

FIG. 18

VIBRATING-MASS GYROSCOPE SYSTEM

TECHNICAL FIELD

The present invention relates generally to sensor systems, and specifically to a vibrating-mass gyroscope system.

BACKGROUND

There are a number different types of vibrating-mass gyroscope systems that can be configured to calculate rotation about a sensitive (e.g., input or sense) axis. One type of gyroscope is a Coriolis vibratory gyroscope (CVG). There are a number of examples of a CVG, such as vibrating-mass gyroscopes and tuning fork gyroscopes. As an example, in a CVG, at least one mass can vibrate in-plane along a drive axis. In response to an applied angular rate about an input axis parallel to the vibrating-mass, Coriolis forces cause the vibrating-mass to vibrate out of plane along a sense axis (e.g., 90° relative to a drive axis). The amplitude of the out-of-plane motion in open loop instruments or the force required to rebalance and null the out-of-plane motion in closed-loop instruments can correspond to a measure of the angular rate applied about the input axis.

SUMMARY

One embodiment includes a gyroscope system. The system includes a sensor system comprising a vibrating-mass and electrodes each arranged to provide one of a driving force and a force-rebalance to the vibrating-mass in each of three orthogonal axes. The system also includes a gyroscope controller that generates a drive signal provided to a first electrode of the electrodes to provide the driving force to facilitate an in-plane periodic oscillatory motion of the vibrating-mass along a first axis of the three orthogonal axes. The gyroscope controller also generates a force-rebalance signal provided to each of a second electrode and a third electrode of the plurality of electrodes associated with a respective second axis and a respective third axis of the three orthogonal axes to calculate a rotation of the gyroscope system about the respective second axis and the respective third axis of the three orthogonal axes.

Another embodiment includes a method for measuring rotation about each of three orthogonal axes via a gyroscope system. The method includes providing a drive signal to a first electrode to provide a driving force to a vibrating-mass along a first axis of the three orthogonal axes during a first time period, and providing a first force-rebalance signal to a second electrode to provide a first force-rebalance to the vibrating-mass in a second axis of the three orthogonal axes during the first time period to calculate a rotation of the gyroscope system about the second axis based on the first force-rebalance signal. The method also includes providing a second force-rebalance signal to a third electrode to provide a second force-rebalance to the vibrating-mass in a third axis of the three orthogonal axes during the first time period to calculate a rotation of the gyroscope system about the third axis based on the second force-rebalance signal and providing the drive signal to the second electrode to provide the driving force to the vibrating-mass along the second axis during a second time period. The method further includes providing the first force-rebalance signal to the first electrode to provide the first force-rebalance to the vibrating-mass in the first axis during the second time period to calculate a rotation of the gyroscope system about the first axis based on the first force-rebalance signal.

Another embodiment includes a gyroscope system that includes a first sensor system comprising a first vibrating-mass and a first set of electrodes arranged to provide a first driving force in a first axis of three orthogonal axes, a first force-rebalance in a second axis of the three orthogonal axes, and a second force-rebalance in a third axis of the three orthogonal axes to the first vibrating-mass. The system also includes a second sensor system comprising a second vibrating-mass and a second set of electrodes arranged to provide a second driving force in the second axis, a third force-rebalance in the first axis, and a fourth force-rebalance in the third axis to the second vibrating-mass. The system further includes a gyroscope controller configured to generate a first drive signal and a second drive signal that are provided to the first and second sets of electrodes, respectively, to provide respective first and second driving forces to facilitate in-plane periodic oscillatory motion of the first and second vibrating-masses along the respective first and second axes, to generate first force-rebalance signals that are provided to the first set of electrodes to calculate a rotation of the gyroscope system about the respective second and third axes, and to generate second force-rebalance signals that are provided to the second set of electrodes to calculate the rotation of the gyroscope system about the respective first and third axes.

BRIEF DESCRIPTION OF THE DRAWINGS

FIG. 18 illustrates an example of a method for measuring rotation about each of three orthogonal axes via a gyroscope system.

DETAILED DESCRIPTION

The present invention relates generally to sensor systems, and specifically to a vibrating-mass gyroscope system. The vibrating-mass gyroscope system includes a sensor system and a gyroscope controller. The sensor system can include at least one vibrating-mass that can be arranged as a substantially planar vibrating-mass and a set of electrodes. The electrodes can include a first electrode that can receive a drive signal from the gyroscope controller to provide a driving force of the vibrating-mass along a first axis of three orthogonal-axes to provide an in-plane oscillatory motion of the vibrating-mass. The electrodes can also include a second electrode that receives a first force-rebalance signal provided by the gyroscope controller and a third electrode that receives a second force-rebalance signal provided by the gyroscope controller to provide force-rebalance of the vibrating-mass in each of second and third axes of the three-orthogonal axes. As a result, the gyroscope controller can calculate a rotation of the gyroscope system about the second and third axes based on the force-rebalance signals (e.g., based on an amplitude of the force-rebalance signals). The single sensor system can have drive and/or force-rebalance control of the vibrating-mass in each of the three orthogonal axes.

As an example, the gyroscope system can include a plurality of sensor systems. The gyroscope controller can be configured to provide drive signals to each of the sensor systems to provide the drive force to the respective vibrating-masses along separate axes, and to provide the force-rebalance signals to the other of the three orthogonal axes with respect to each of the sensor systems. As a result, the gyroscope controller can calculate the rotation of the gyroscope system about the three orthogonal axes based on the separate force-rebalance signals applied with respect to the three orthogonal axes. Additionally, the gyroscope controller can be configured to alternately change the axis along which the drive signal, and thus along which the force-rebalance signals, are applied to each of the sensor systems. As a result, a given one sensor system can be configured to facilitate calculation of rotation of the gyroscope system about the three orthogonal axes during separate time periods. Furthermore, for multiple sensor systems, the rotation of the gyroscope system about a given one axis can be calculated differentially in two separate time periods to facilitate calibration of the sensor system with respect to the rotation of the gyroscope system about the respective axis.

Figure 1:
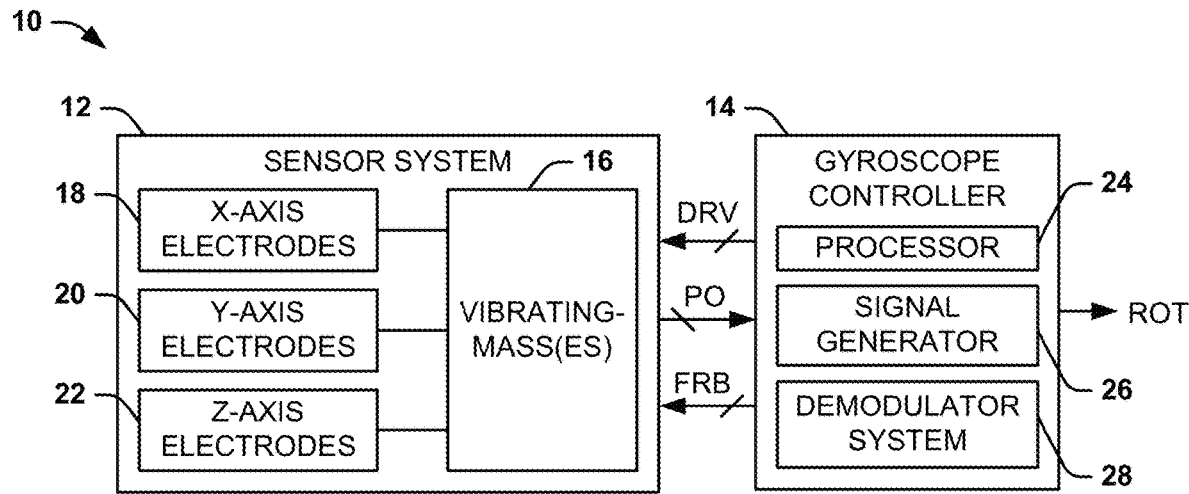
FIG. 1 illustrates an example of a vibrating-mass gyroscope system.

FIG. 1 illustrates an example of a vibrating-mass gyroscope system 10. The vibrating-mass gyroscope system 10 can be implemented in any of a variety of applications with which accurate measurement of rotation may be necessary, such as aerospace and nautical navigation. The vibrating-mass gyroscope system 10 includes a sensor system 12 and a gyroscope controller 14.

The sensor system 12 includes at least one vibrating-mass 16 that can be arranged as a substantially planar inertial mass. As an example, the vibrating-mass(es) 16 can be arranged as an even-number quantity (e.g., four) of vibrating-masses arranged in pairs. For example, the vibrating-mass(es) 16 can be fabricated as a layer of silicon, and can be fabricated in an approximate square shape to allow for in-plane movement about three orthogonal axes. In the example of FIG. 1, the sensor system 12 includes one or more sets of X-axis electrodes 18, one or more sets of Y-axis electrodes 20, and one or more sets of Z-axis electrodes 22 that can each be coupled to a respective one of the vibrating-mass(es) 16, such that each of the vibrating-mass(es) 16 can be associated with a respective set of each of the X, Y, and Z-axis electrodes 18, 20, and 22.

As an example, the sets of X, Y, and Z-axis electrodes 18, 20, and 22 can be arranged at a periphery of the vibrating-mass(es) 16 to provide for in-plane periodic oscillatory movement and force-rebalance of the vibrating-mass(es) 16 in each of the three orthogonal axes. For example, the sets of X, Y, and Z-axis electrodes 18, 20, and 22 can each include capacitively coupled electrode pairs that are configured to generate an attractive electrostatic force with respect to the vibrating-masses(es) 16 to move the vibrating-mass(es) 16 with respect to a stationary housing (e.g., on which the X, Y, and Z-axis electrodes 18, 20, and 22 are coupled). As described herein, at a given time of operation of the sensor system 12, one of the X, Y, and Z-axis electrodes 18, 20, and 22 can correspond to a drive axis along which a drive force is provided to the vibrating-mass(es) 16 to facilitate the in-plane periodic oscillatory movement, while the other two of the X, Y, and Z-axis electrodes 18, 20, and 22 correspond to sense axes for calculation of rotation of the gyroscope system 10 about the respective sense axes.

The gyroscope controller 14 is configured to receive pickoff signals PO that can collectively be associated with the X, Y, and Z-axis electrodes 18, 20, and 22, such as to provide force-rebalance of the vibrating-mass(es) 16. The gyroscope controller 14 can also be configured to generate one or more drive signals DRV that are provided to one of the sets of X, Y, and Z-axis electrodes 18, 20, and 22 in a given time period to generate electrostatic force to provide an in-plane periodic oscillatory motion of the vibrating-mass(es) 16 along a respective drive axis associated with one of the orthogonal axes. For example, the drive signal(s) DRV can have a frequency that is approximately equal to a resonant frequency associated with one or more flexures that couple the vibrating-mass(es) 16 to an associated housing to which the X, Y, and Z-axis electrodes 18, 20, and 22 are coupled. As an example, as described in greater detail herein, in the example of plural vibrating-masses 16, the in-plane periodic oscillatory motion can be provided at 180° out-of-phase with respect to each given pair of vibrating-masses 16 to provide counter-balanced motion of the vibrating-mass(es) 16. Therefore, as described herein, the sensor system 12 is arranged such that the vibrating-mass(es) 16 can be driven substantially similarly along any of the three orthogonal axes in response to the drive signal(s) DRV being applied to any of the respective X, Y, and Z-axis electrodes 18, 20, and 22.

The gyroscope controller 14 is also configured to generate force-rebalance signals FRB that are provided to the other two sets of the X, Y, and Z-axis electrodes 18, 20, and 22 relative to the drive signal(s) DRV to generate electrostatic force along respective sense axes that are each orthogonal with respect to the drive axis to null the sense pickoff and the motion of the vibrating-mass(es) 16 in response to rotation of the sensor system 12 about the respective sense axes, such as in response to sense pickoff signals PO. For example, the force-rebalance signals FRB can include a first force-rebalance signal $FRB_1$ and a second force-rebalance signal $FRB_2$ that are provided to a respective two of the X, Y, and Z-axis electrodes 18, 20, and 22 that are not receiving the drive signal(s) DRV. As an example, the force-rebalance signals FRB can have a frequency that is approximately equal to the frequency of the drive signal(s) DRV (e.g., approximately equal to the resonant frequency of the associated flexures).

The drive signal(s) DRV and the force-rebalance signals FRB can be generated at an amplitude that is based on demodulated pickoff signal(s), demonstrated in the example of FIG. 1 as signals PO. As an example, the demodulated sense pickoff signals PO can have a frequency that is significantly greater than the frequency of the force-rebalance signals FRB (e.g., an order of magnitude or greater).

Therefore, rotation of the sensor system 12 about a given axis can result in a Coriolis force-induced motion of the vibrating-mass(es) 16 orthogonally with respect to the in-plane periodic oscillatory motion associated with the drive axis. Accordingly, the electrostatic force that is generated by the force-rebalance in the other two orthogonal axes in response to the force-rebalance signals FRB can force the vibrating-mass(es) 16 to be maintained at a null position along the respective sense axes. As described herein, the term "null position" corresponds to a position of the vibrating-mass(es) 16 along the sense axes corresponding to an approximate zero value associated with the demodulated pickoff signal(s).

The gyroscope controller 14 includes a processor 24, a signal generator 26, and a demodulator system 28. The signal generator 26 is configured to generate the drive signal(s) DRV and the force-rebalance signals FRB that are provided to the X, Y, and Z-axis electrodes 18, 20, and 22. In response to the application of the drive signal(s) DRV and the force-rebalance signals FRB, the pickoff signals PO are provided to the demodulator system 28. As an example, the pickoff signals PO can correspond to amplitude-modulated pickoff signals that are capacitively coupled to the X, Y, and Z-axis electrodes 18, 20, and 22 in response to motion of the vibrating-mass(es) 16. The pickoff signals PO can thus be demodulated via the demodulator system 28 to determine an appropriate magnitude of the respective drive signals DRV and/or force-rebalance signals FRB, such as to maintain the in-plane periodic oscillatory motion of the vibrating-mass(es) 16 and to maintain the vibrating-mass(es) 16 in the null position in the sense axes, respectively.

Thus, the processor 24 can calculate the magnitude of the force-rebalance signals FRB in a manner that is indicative of the rate of angular rotation of the sensor system 12 about the respective sense axes. As an example, a magnitude of the force-rebalance signals FRB, and thus the electrostatic force, that is required to maintain the vibrating-mass(es) 16 at the null position along a given one of the sense axes can correspond to a rate of rotation of the sensor system 12 about the respective sense axis. Therefore, the magnitude of the force-rebalance signals FRB can be implemented by the processor 24 to calculate the angular rotation of the sensor system 12 about the respective sense axis. Accordingly, the gyroscope controller 14 can provide the measurement of the angular rate of rotation about the respective sense axes as an output signal ROT.

Figure 2:
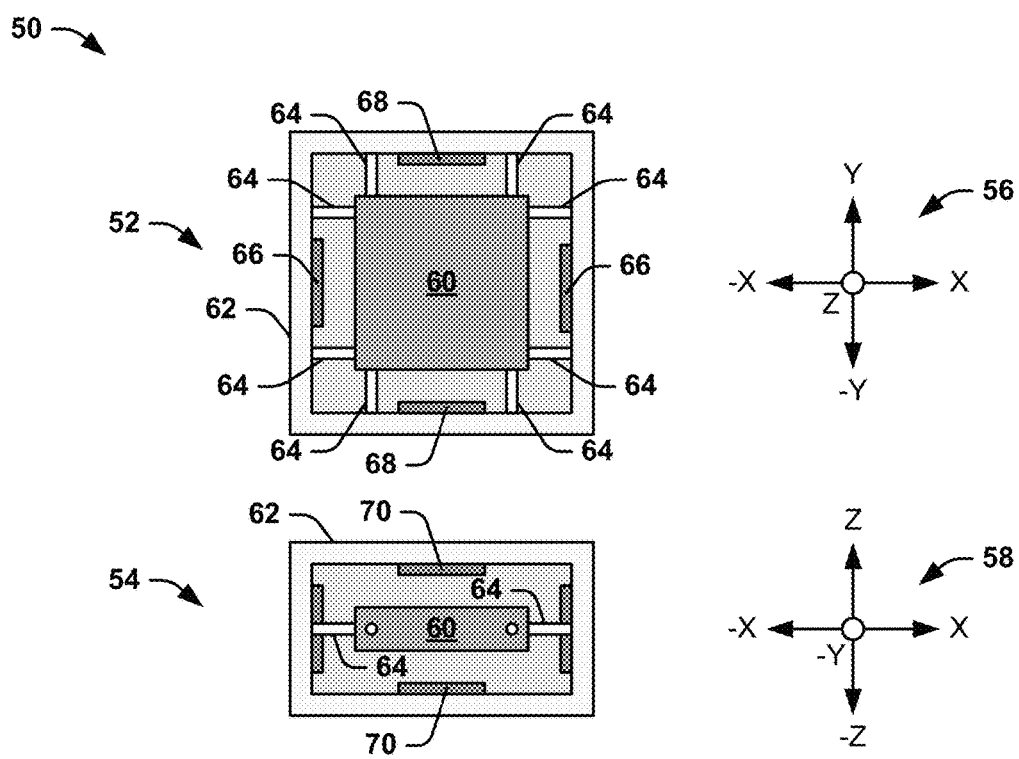
FIG. 2 illustrates an example of a sensor system.

FIG. 2 illustrates an example of a sensor system 50. The sensor system 50 can correspond to the sensor system 12 in the example of FIG. 1. Therefore, reference is to be made to the example of FIG. 1 in the following example of FIG. 2.

The sensor system 50 is demonstrated in two plan views 52 and 54 that are orthogonal, as demonstrated by the Cartesian coordinate systems 56 and 58. The sensor system 50 includes a vibrating-mass 60 that is coupled to a housing 62 via spring flexures 64. While the example of FIG. 2 demonstrates that the vibrating-mass 60 is coupled to each of the interior walls of the housing 62 via pairs of spring flexures 64, it is to be understood that the flexures 64 can be arranged in any of a variety of ways. The flexures 64 are configured to facilitate motion of the vibrating-mass 60 relative to the housing 62 in each of the three orthogonal axes in response to electrostatic forces and/or Coriolis forces. Additionally, the sensor system 50 also includes sets of electrodes, demonstrated in the example of FIG. 2 as X-axis electrodes 66, Y-axis electrodes 68, and Z-axis electrodes 70. It is to be understood that the Z-axis electrodes 70 are not visible in the first view 52 and the Y-axis electrodes are not visible in the second view 54 for drawing simplicity.

The sensor system 50 is thus demonstrated in the example of FIG. 2 as being approximately symmetrical about each of the three orthogonal axes to provide for application of the drive signal(s) DRV to a given one of the sets of electrodes 66, 68, and 70 at a given one time to provide for in-plane periodic oscillatory motion along that respective axis as the drive axis, such that the other two of the sets of electrodes 66, 68, and 70 can each correspond to sense axes for calculation of the rotation of the sensor system 50 about the respective sense axes based on providing respective force-rebalance signals to the other two of the sets of electrodes 66, 68, and 70.

Figure 3:
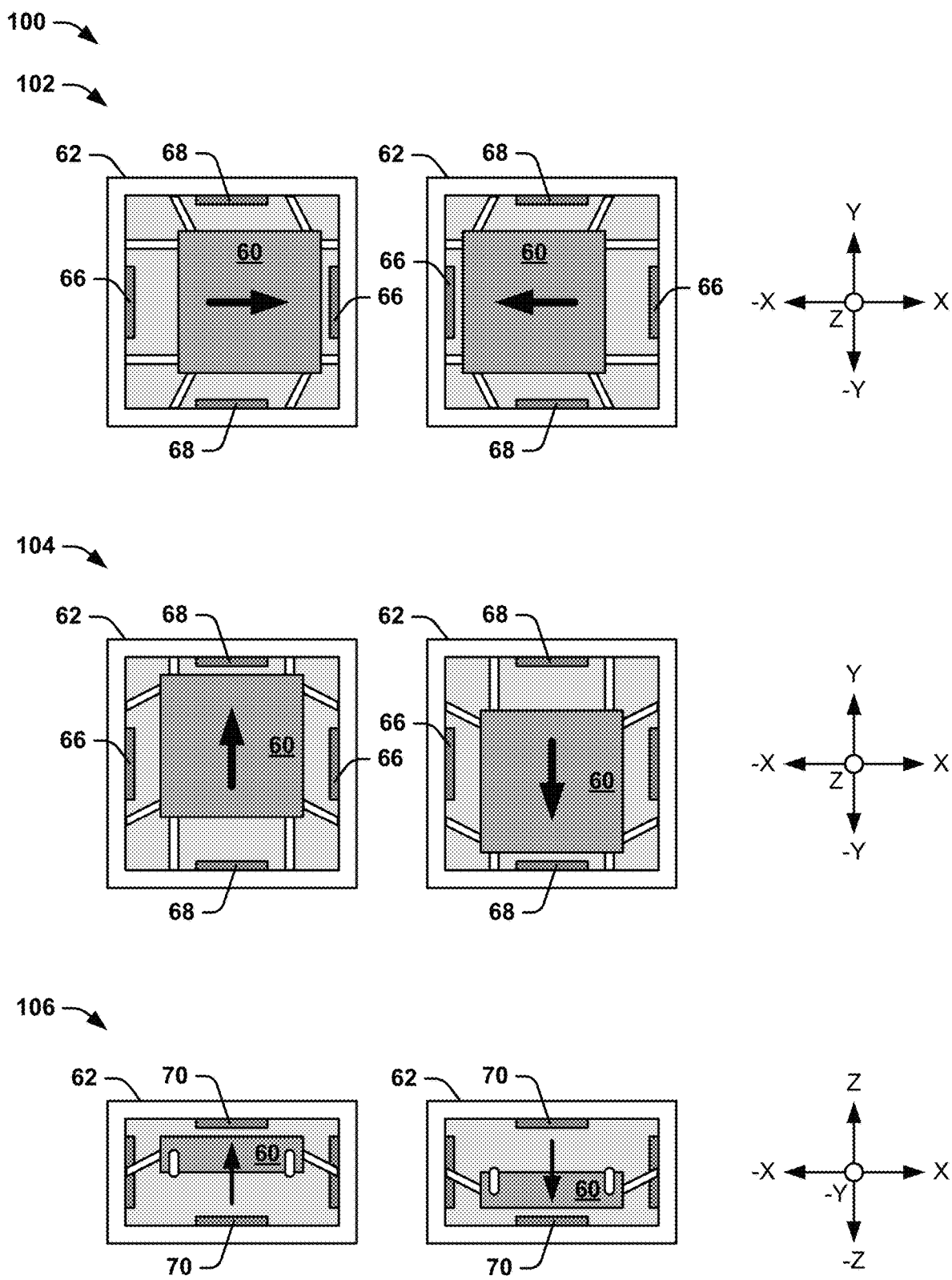
FIG. 3 illustrates an example diagram of motion of a sensor system.

FIG. 3 illustrates an example diagram 100 of motion of the sensor system 50. The diagram 100 demonstrates the sensor system 50, and the associated components of the sensor system 50. Therefore, like reference numbers are used and reference is to be made to the example of FIGS. 1 and 2 in the following example of FIG. 3.

The diagram 100 includes first motion 102 of the sensor system 50, in which the drive signal(s) DRV are provided to the X-axis electrodes 66 to provide in-plane periodic oscillatory motion of the vibrating-mass 60 along the X-axis, demonstrated in the +X direction at 104 and in the X direction at 106. As an example, the drive signal(s) DRV can include a single signal provided to one of the X-axis electrodes 66 to provide an attractive electrostatic force in one direction (e.g., the +X direction) in one phase, and the spring flexures 64 provide a reactionary motion of the vibrating-mass 60 in the opposite direction at an opposite (e.g., 180°) phase. As another example, the drive signal(s) DRV can include a pair of drive signals DRV that are provided 180° out-of-phase with respect to each other to provide an attractive electrostatic force in each of the X-axis respective directions at each of opposite phases. As an example, while the gyroscope controller 14 provides the drive signal(s) DRV to the X-axis electrodes 66 in the first motion 102, the gyroscope controller 14 can provide first force-rebalance signals $FRB_1$ to the Y-axis electrodes 68 and second force-rebalance signals $FRB_2$ to the Z-axis electrodes 70 to maintain the vibrating-mass 60 in the null position along the respective Y and Z sense-axes.

The diagram 100 includes second motion 108 of the sensor system 50, in which the drive signal(s) DRV are provided to the Y-axis electrodes 68 to provide in-plane periodic oscillatory motion of the vibrating-mass 60 along the Y-axis, demonstrated in the +Y direction at 110 and in the Y direction at 112. As an example, the drive signal(s) DRV can include a single signal provided to one of the Y-axis electrodes 68 to provide an attractive electrostatic force in one direction (e.g., the +Y direction) in one phase, and the spring flexures 64 provide a reactionary motion of the vibrating-mass 60 in the opposite direction at an opposite (e.g., 180°) phase. As another example, the drive signal(s) DRV can include a pair of drive signals DRV that are provided 180° out-of-phase with respect to each other to provide an attractive electrostatic force in each of the respective Y-axis directions at each of opposite phases. As an example, while the gyroscope controller 14 provides the drive signal(s) DRV to the Y-axis electrodes 68 in the first motion 108, the gyroscope controller 14 can provide first force-rebalance signals $FRB_1$ to the X-axis electrodes 66 and second force-rebalance signals $FRB_2$ to the Z-axis electrodes 70 to maintain the vibrating-mass 60 in the null position along the respective X and Z sense-axes.

The diagram 100 includes third motion 114 of the sensor system 50, in which the drive signal(s) DRV are provided to the Z-axis electrodes 70 to provide in-plane periodic oscillatory motion of the vibrating-mass 60 along the Z-axis, demonstrated in the +Z direction at 116 and in the Z direction at 118. As an example, the drive signal(s) DRV can include a single signal provided to one of the Z-axis electrodes 70 to provide an attractive electrostatic force in one direction (e.g., the +Z direction) in one phase, and the spring flexures 64 provide a reactionary motion of the vibrating-mass 60 in the opposite direction at an opposite (e.g., 180°) phase. As another example, the drive signal(s) DRV can include a pair of drive signals DRV that are provided 180° out-of-phase with respect to each other to provide an attractive electrostatic force in each of the respective Z-axis directions at each of opposite phases. As an example, while the gyroscope controller 14 provides the drive signal(s) DRV to the Z-axis electrodes 70 in the first motion 114, the gyroscope controller 14 can provide first force-rebalance signals $FRB_1$ to the X-axis electrodes 66 and second force-rebalance signals $FRB_2$ to the Y-axis electrodes 68 to maintain the vibrating-mass 60 in the null position along the respective X and Y sense-axes.

Figure 4:
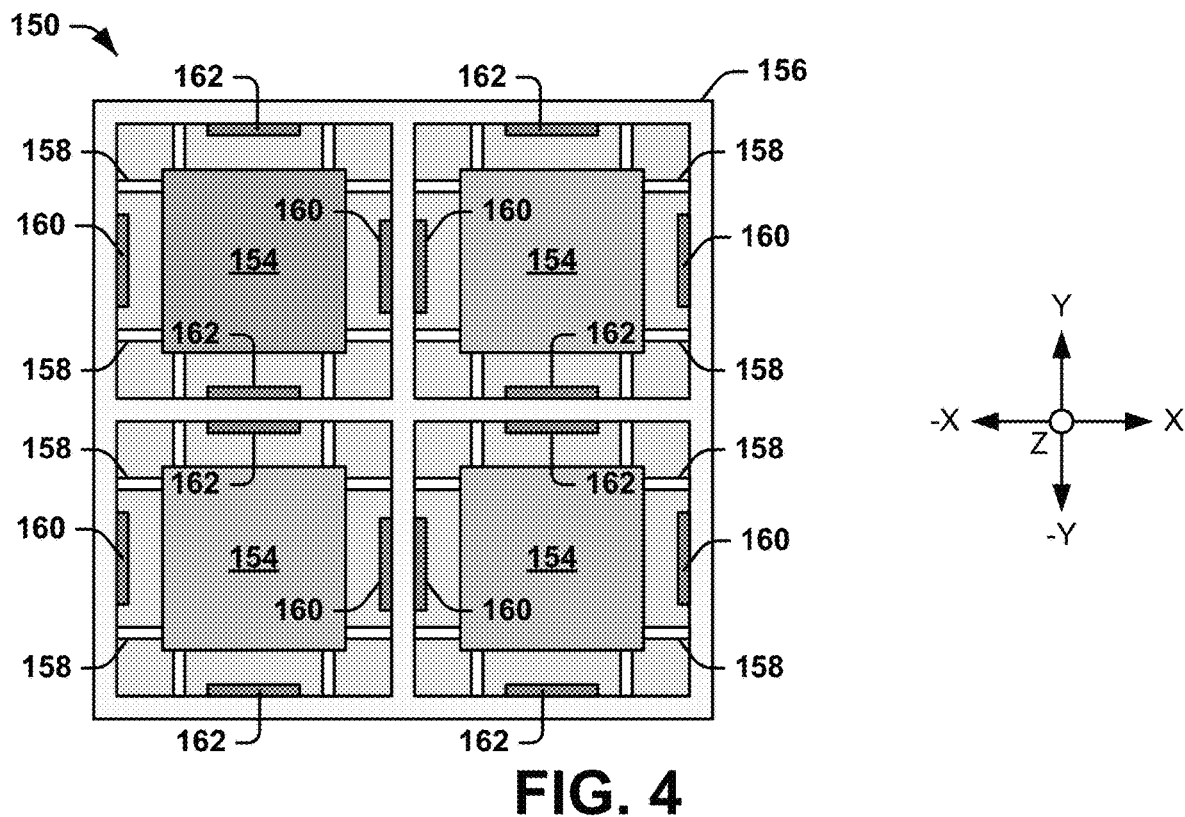
FIG. 4 illustrates another example of a sensor system.

FIG. 4 illustrates another example of a sensor system 150. The sensor system 150 can correspond to the sensor system 12 in the example of FIG. 1. Therefore, reference is to be made to the example of FIG. 1 in the following example of FIG. 4.

The sensor system 150 is demonstrated in a plan view along the Z-axis, as demonstrated by the Cartesian coordinate system 152. The sensor system 150 includes four vibrating-masses 154 that are each coupled to a housing 156 via spring flexures 158. While the example of FIG. 4 demonstrates that the vibrating-masses 154 are each coupled to each of the interior walls of the housing 156 via pairs of spring flexures 158, it is to be understood that the flexures 158 can be arranged in any of a variety of ways. The flexures 158 are configured to facilitate motion of the vibrating-mass 154 relative to the housing 156 in each of the three orthogonal axes in response to electrostatic forces and/or Coriolis forces. As an example, the in-plane periodic oscillatory motion of the vibrating-masses 154 can be provided at 180° out-of-phase with respect to each given pair of the vibrating-masses 154 to provide counter-balanced motion of the vibrating-mass(es) 154. Additionally, the sensor system 150 also includes sets of electrodes, demonstrated in the example of FIG. 4 as sets of X-axis electrodes 160, sets of Y-axis electrodes 162, and sets of Z-axis electrodes (not visible in the example of FIG. 4).

The sensor system 150 is thus demonstrated in the example of FIG. 4 as being approximately symmetrical about each of the three orthogonal axes to provide for application of the drive signal(s) DRV to a given one of the sets of electrodes 160, 162, and the Z-axis electrodes at a given one time to provide for in-plane periodic oscillatory motion along that respective axis as the drive axis, such that the other two of the sets of electrodes 160, 162, and the Z-axis electrodes can each correspond to sense axes for calculation of the rotation of the sensor system 150 about the respective sense axes based on providing respective force-rebalance signals to the other two of the sets of electrodes 160, 162, and the Z-axis electrodes.

Figure 5:
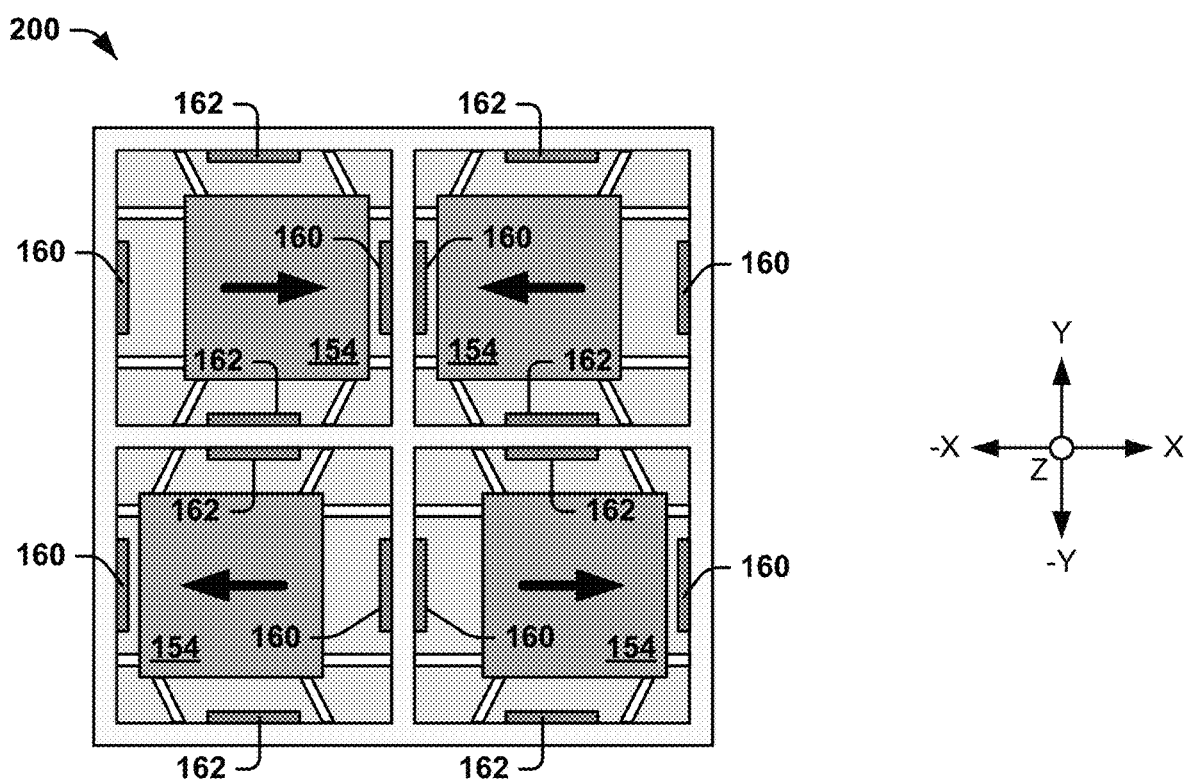
FIG. 5 illustrates another example diagram of motion of a sensor system.

FIG. 5 illustrates an example diagram 200 of motion of the sensor system 150. The diagram 200 demonstrates the sensor system 150, and the associated components of the sensor system 150. Therefore, like reference numbers are used and reference is to be made to the example of FIGS. 1 and 4 in the following example of FIG. 5.

The diagram 200 includes motion of the sensor system 150, in which the drive signal(s) DRV are provided to the sets of X-axis electrodes 160 to provide in-plane periodic oscillatory motion of the vibrating-masses 154 along the X-axis. In the example of FIG. 4, the vibrating-masses 154 are demonstrated as being out-of-phase by approximately 180° with respect to each pair of the vibrating-masses 154, such that each pair of vibrating-masses 154 is concurrently moving in both +X direction and the −X direction. Similar to as described previously, the drive signal(s) DRV can include a single signal provided to a given one of the sets of X-axis electrodes 160 to provide an attractive electrostatic force in one direction (e.g., the +X direction) in one phase, and the spring flexures 158 provide a reactionary motion of the vibrating-masses 154 in the opposite direction at an opposite (e.g., 180°) phase. As another example, the drive signal(s) DRV can include a pair of drive signals DRV that are provided 180° out-of-phase with respect to each other to provide an attractive electrostatic force in each of the X-axis respective directions at each of opposite phases. As an example, while the gyroscope controller 14 provides the drive signal(s) DRV to the sets of X-axis electrodes 160, the gyroscope controller 14 can provide first force-rebalance signals FRB to the sets of Y-axis electrodes 162 and second force-rebalance signals $FRB_Z$ to the sets of Z-axis electrodes (not shown in the example of FIGS. 4 and 5) to maintain the vibrating-masses 154 in the null position along the respective Y and Z sense-axes.

While the example of FIG. 5 demonstrates only motion of the vibrating-masses 154 along the X-axis, it is to be understood that the drive signals DRV can be provided to the sets of Y-axis electrodes 162 or to the sets of Z-axis electrodes to provide for in-plane periodic oscillatory motion along the respective Y and Z-axes, as well, similar to as described in the example of FIG. 3.

Referring back to the example of FIG. 1, as described previously, the gyroscope system 10 can be configured to calculate the rate of rotation ROT about two of the orthogonal axes based on providing the drive signal(s) DRV to one of the sets of electrodes 18, 20, and 22 to drive the vibrating-mass 16 along the respective one of the orthogonal axes and by providing the force-rebalance signals FRB to the other two sets of electrodes 18, 20, and 22 to calculate the rate of rotation ROT about the respective two orthogonal axes associated with the other two sets of electrodes 18, 20, and 22. However, because the vibrating-mass 16 is arranged to be able to be driven along any of the three orthogonal axes, the gyroscope controller 14 can be configured to change the drive axis during operation of the gyroscope system 10, and thus change the sense axes of the gyroscope system 10. As a result, a given one sensor system 12 can be configured to facilitate calculation of the rate of rotation ROT about any two of the orthogonal axes in each of different time periods in response to changing the drive axis in the different time periods. As an example, changing the drive axis based on providing the drive signal(s) DRV to a different one of the sets of electrodes 18, 20, and 22 can provide for alternately facilitating measurement of the rate of rotation ROT about the other two orthogonal axes, respectively, and thus to allow a single sensor system 12 to measure the rate of rotation ROT about all three orthogonal axes over different time periods. As another example, implementing multiple sensor systems 12 can facilitate concurrent calculation of the rotation ROT about all three orthogonal axes, and can allow for one or more of the sensor systems 12 to be calibrated, as described in greater detail herein.

As an example, the gyroscope system 10 can include a plurality of substantially identical sensor systems 12. As one example, the gyroscope system 10 can include two substantially identical sensor systems 12, and as another example, the gyroscope system 10 can include three substantially identical sensor systems 12. For example, the sensor systems 12 can be arranged in a substantially common coplanar arrangement. In each example of plural sensor systems 12, the drive signal(s) DRV can be provided to a different set of electrodes 18, 20, and 22 in each of the different sensor systems 12. Accordingly, the rate of rotation ROT can be calculated concurrently for each of the three orthogonal axes. Additionally, the rate of rotation ROT about at least one of the axes can be calculated redundantly. For example, such redundancy can facilitate calibration of the respective sensor systems 12 about the given one of the orthogonal axes.

Figure 6:
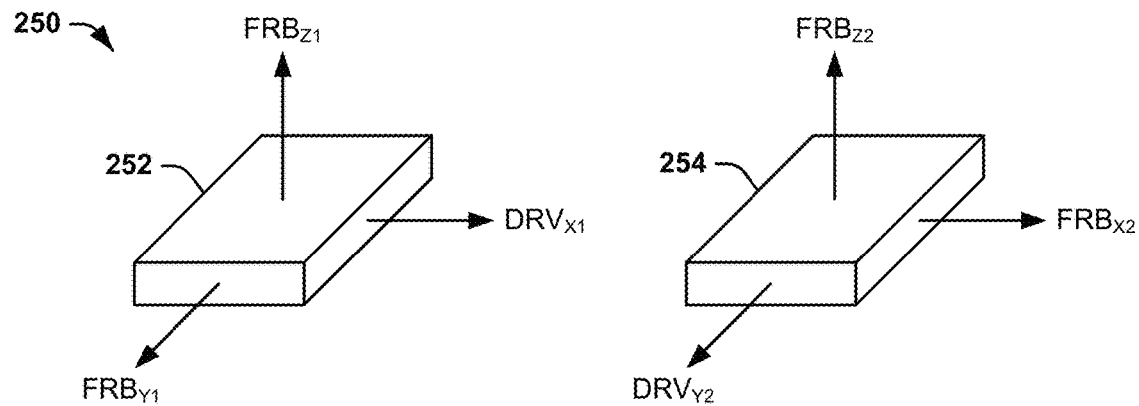
FIG. 6 illustrates another example of a gyroscope system.

FIG. 6 illustrates another example of a gyroscope system 250. The gyroscope system 250 can correspond to a portion of the gyroscope system 10 in the example of FIG. 1. In the example of FIG. 6, the gyroscope system 250 includes a first sensor system 252 and a second sensor system 254. As an example, each of the sensor systems 252 and 254 can be configured substantially similar to the sensor system 50 in the example of FIG. 2 or the sensor system 150 in the example of FIG. 4. Therefore, reference is to be made to the examples of FIGS. 1-5 in the following description of the example of FIG. 6.

In the example of FIG. 6, the first sensor system 252 is demonstrated diagrammatically as being provided an X-axis drive signal $DRV_{X1}$ to facilitate the in-plane periodic oscillatory motion of the vibrating-mass(es) along the X-axis. Therefore, the X-axis corresponds to the drive axis for the first sensor system 252 in the example of FIG. 6. The first sensor system 252 is also demonstrated diagrammatically as being provided a Y-axis force-rebalance signal $FRB_{Y1}$ to facilitate force-rebalance of the vibrating-mass(es) in the Y-axis, and as being provided a Z-axis force-rebalance signal $FRB_{Z1}$ to facilitate force-rebalance of the vibrating-mass(es) in the Z-axis. As a result, the gyroscope controller 14 can be configured to calculate the rate of rotation of the first sensor system 252 about the Y-axis and the Z-axis based on pickoff signals PO resulting from Coriolis forces that act upon the vibrating-mass(es) with respect to the Y-axis and the Z-axis, respectively.

Similarly, the second sensor system 254 is demonstrated diagrammatically as being provided a Y-axis drive signal $DRV_{Y2}$ to facilitate the in-plane periodic oscillatory motion of the vibrating-mass(es) along the Y-axis. Therefore, the Y-axis corresponds to the drive axis for the second sensor system 254 in the example of FIG. 6. The second sensor system 254 is also demonstrated diagrammatically as being provided an X-axis force-rebalance signal $FRB_{X2}$ to facilitate force-rebalance of the vibrating-mass(es) in the X-axis, and as being provided a Z-axis force-rebalance signal $FRB_{Z2}$ to facilitate force-rebalance of the vibrating-mass(es) in the Z-axis. As a result, the gyroscope controller 14 can be configured to calculate the rate of rotation of the second sensor system 254 about the Y-axis and the Z-axis based on pickoff signals PO resulting from Coriolis forces that act upon the vibrating-mass(es) with respect to the Y-axis and the Z-axis, respectively.

As an example, the first and second sensor systems 252 and 254 can be provided the respective drive signals $DRV_{X1}$ and $DRV_{Y2}$ signals concurrently, and can likewise be provided the respective force-rebalance signals $FRB_{Y1}$, $FRB_{Z1}$, $FRB_{X2}$, and $FRB_{Z2}$ concurrently. Therefore, the gyroscope system 250 can be configured to measure the rate of rotation ROT about the Y and Z-axes based on the force-rebalance signals $FRB_{Y1}$ and $FRB_{Z1}$ associated with the first sensor system 252, and can measure the rate of rotation ROT about the X and Z-axes based on the force-rebalance signals $FRB_{X2}$ and $FRB_{Z2}$ associated with the second sensor system 254. Accordingly, the gyroscope system 250 can be configured to concurrently calculate the rate of rotation of the gyroscope system 250 about all three orthogonal axes concurrently using only two sensor systems 252 and 254. As a result, the gyroscope system 250 can be implemented in a less expensive and more simplistic manner than gyroscope systems that implement separate sensor systems for each orthogonal axis. Additionally, the first and second sensor systems 252 and 254 can be fabricated on a common plane, such that the gyroscope system 250 can be fabricated in a more compact and planar arrangement to reduce space.

Furthermore, as described previously, the gyroscope controller 14 can be configured to change the drive axis of each of the sensor systems 252 and 254 in each of different time periods to change the drive axes, and thus the sense axes, of each of the sensor systems 252 and 254. As an example, while the example of FIG. 6 demonstrates that the first sensor system 252 is driven along the X-axis to measure the rate of rotation ROT about the Y-axis and Z-axis, and that the second sensor system 254 is driven along the Y-axis to measure the rate of rotation ROT about the X-axis and Z-axis, the gyroscope controller 14 can alternately or concurrently change the respective drive axes. For example, the gyroscope controller 14 can, in a subsequent time period, provide a Y-axis drive signal $DRV_{Y1}$, an X-axis force-rebalance signal $FRB_{X1}$, and the Z-axis force-rebalance signal $FRB_{Z1}$ to the first sensor system 252, and can provide a Z-axis drive signal $DRV_{Z2}$, the X-axis force-rebalance signal $FRB_{X2}$, and a Y-axis force-rebalance signal $FRB_{Y2}$ to the second sensor system 254. As a result, in the subsequent time period, the first sensor 252 can be driven along the Y-axis to measure the rate of rotation ROT about the X-axis and Z-axis, and the second sensor system 254 can be driven along the Z-axis to measure the rate of rotation ROT about the X-axis and Y-axis. As an example, the gyroscope controller 14 can stop the in-plane periodic oscillatory motion along the drive axis of a previous time period based on the force-rebalance signal(s) FRB, and can wait until the vibrating-mass(es) are nulled along the respective axis before calculating the rate of rotation ROT about the respective two orthogonal axes when changing the respective drive axis. While the respective one of the sensor systems 252 and 254 changes from one drive axis to another, the other of the sensor systems 252 and 254 can continue to calculate rate of rotation ROT about the respective two orthogonal axes in real-time.

Figure 7:
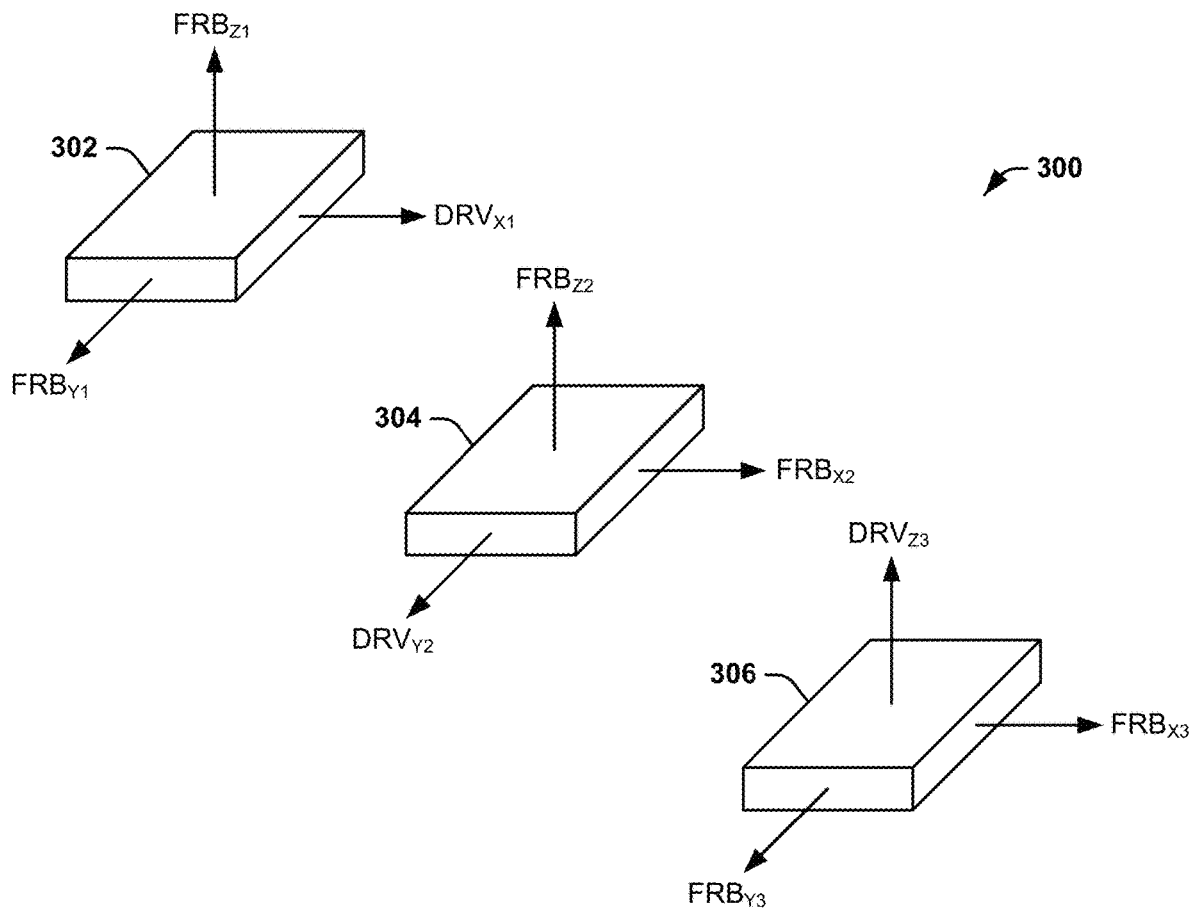
FIG. 7 illustrates yet another example of a gyroscope system.

FIG. 7 illustrates another example of a gyroscope system 300. The gyroscope system 300 can correspond to a portion of the gyroscope system 10 in the example of FIG. 1. In the example of FIG. 7, the gyroscope system 300 includes a first sensor system 302, a second sensor system 304, and a third sensor system 306. As an example, each of the sensor systems 302, 304, and 306 can be configured substantially similar to the sensor system 50 in the example of FIG. 2 or the sensor system 150 in the example of FIG. 4. Therefore, reference is to be made to the examples of FIGS. 1-5 in the following description of the example of FIG. 7.

In the example of FIG. 7, the first sensor system 302 is demonstrated diagrammatically as being provided an X-axis drive signal $DRV_{X1}$ to facilitate the in-plane periodic oscillatory motion of the vibrating-mass(es) along the X-axis. Therefore, the X-axis corresponds to the drive axis for the first sensor system 302 in the example of FIG. 7. The first sensor system 302 is also demonstrated diagrammatically as being provided a Y-axis force-rebalance signal $FRB_{Y1}$ to facilitate force-rebalance of the vibrating-mass(es) in the Y-axis, and as being provided a Z-axis force-rebalance signal $FRB_{Z1}$ to facilitate force-rebalance of the vibrating-mass(es) in the Z-axis. As a result, the gyroscope controller 14 can be configured to calculate the rate of rotation of the first sensor system 302 about the Y-axis and the Z-axis based on pickoff signals PO resulting from Coriolis forces that act upon the vibrating-mass(es) with respect to the Y-axis and the Z-axis, respectively.

Similarly, the second sensor system 304 is demonstrated diagrammatically as being provided a Y-axis drive signal $DRV_{Y2}$ to facilitate the in-plane periodic oscillatory motion of the vibrating-mass(es) along the Y-axis. Therefore, the Y-axis corresponds to the drive axis for the second sensor system 304 in the example of FIG. 7. The second sensor system 304 is also demonstrated diagrammatically as being provided an X-axis force-rebalance signal $FRB_{X2}$ to facilitate force-rebalance of the vibrating-mass(es) in the X-axis, and as being provided a Z-axis force-rebalance signal $FRB_{Z2}$ to facilitate force-rebalance of the vibrating-mass(es) in the Z-axis. As a result, the gyroscope controller 14 can be configured to calculate the rate of rotation of the second sensor system 304 about the Y-axis and the Z-axis based on pickoff signals PO resulting from Coriolis forces that act upon the vibrating-mass(es) with respect to the Y-axis and the Z-axis, respectively.

Similarly, the third sensor system 306 is demonstrated diagrammatically as being provided a Z-axis drive signal $DRV_{Z3}$ to facilitate the in-plane periodic oscillatory motion of the vibrating-mass(es) along the Z-axis. Therefore, the Z-axis corresponds to the drive axis for the third sensor system 306 in the example of FIG. 7. The third sensor system 306 is also demonstrated diagrammatically as being provided an X-axis force-rebalance signal $FRB_{X3}$ to facilitate force-rebalance of the vibrating-mass(es) in the X-axis, and as being provided a Y-axis force-rebalance signal $FRB_{Y3}$ to facilitate force-rebalance of the vibrating-mass(es) in the Y-axis. As a result, the gyroscope controller 14 can be configured to calculate the rate of rotation of the third sensor system 306 about the X-axis and the Y-axis based on pickoff signals PO resulting from Coriolis forces that act upon the vibrating-mass(es) with respect to the X-axis and the Y-axis, respectively.

As an example, the sensor systems 302, 304, and 306 can be provided the respective drive signals $DRV_{X1}$, $DRV_{Y2}$, and $DRV_{Z3}$ signals concurrently, and can likewise be provided the force-rebalance signals $FRB_{Y1}$ and $FRB_{Z1}$, the force-rebalance signals $FRB_{X2}$ and $FRB_{Z2}$, and the force-rebalance signals $FRB_{X3}$ and $FRB_{Y3}$ concurrently. Therefore, the gyroscope system 300 can be configured to measure the rate of rotation ROT about the Y and Z-axes based on the force-rebalance signals $FRB_{Y1}$ and $FRB_{Z1}$ associated with the first sensor system 302, can measure the rate of rotation ROT about the X and Z-axes based on the force-rebalance signals $FRB_{X2}$ and $FRB_{Z2}$ associated with the second sensor system 304, and can measure the rate of rotation ROT about the X and Y-axes based on the force-rebalance signals $FRB_{X3}$ and $FRB_{Y3}$ associated with the third sensor system 306. Accordingly, the gyroscope system 300 can be configured to concurrently calculate the rate of rotation of the gyroscope system 300 about all three orthogonal axes concurrently.

Additionally, the sensor systems 302, 304, and 306 can be fabricated on a common plane, such that the gyroscope system 300 can be fabricated in a compact and planar arrangement to reduce space.

Furthermore, as described previously, the gyroscope controller 14 can be configured to change the drive axis of each of the sensor systems 302, 304, and 306 in each of different time periods to change the drive axes, and thus the sense axes, of each of the sensor systems 302, 304, and 306. As an example, the example of FIG. 7 demonstrates that the first sensor system 302 is driven along the X-axis to measure the rate of rotation ROT about the Y-axis and Z-axis, and that the second sensor system 304 is driven along the Y-axis to measure the rate of rotation ROT about the X-axis and Z-axis, and that the third sensor system 306 is driven along the Z-axis to measure the rate of rotation ROT about the X-axis and Y-axis. However, as described herein, the gyroscope controller 14 can alternately or concurrently change the respective drive axes. For example, the gyroscope controller 14 can, in a subsequent time period, provide a Y-axis drive signal $DRV_{Y1}$, an X-axis force-rebalance signal $FRB_{X1}$, and the Z-axis force-rebalance signal $FRB_{Z1}$ to the first sensor system 302, can provide a Z-axis drive signal $DRV_{Z2}$, the X-axis force-rebalance signal $FRB_{X2}$, and a Y-axis force-rebalance signal $FRB_{Y2}$ to the second sensor system 304, and can provide an X-axis drive signal $DRV_{X3}$, the Y-axis force-rebalance signal $FRB_{Y3}$, and a Z-axis force-rebalance signal $FRB_{Z3}$ to the third sensor system 306. As a result, in the subsequent time period, the first sensor 302 can be driven along the Y-axis to measure the rate of rotation ROT about the X-axis and Z-axis, the second sensor system 304 can be driven along the Z-axis to measure the rate of rotation ROT about the X-axis and Y-axis, and the third sensor system 306 can be driven along the X-axis to measure the rate of rotation ROT about the Y-axis and Z-axis. Accordingly, as described in greater detail herein, while a respective one of the sensor systems 302, 304, and 306 changes from one drive axis to another, the other two of the sensor systems 302, 304, and 306 can collectively continue to calculate rate of rotation ROT about the three orthogonal axes in real-time to provide for uninterrupted operation.

Figure 8:
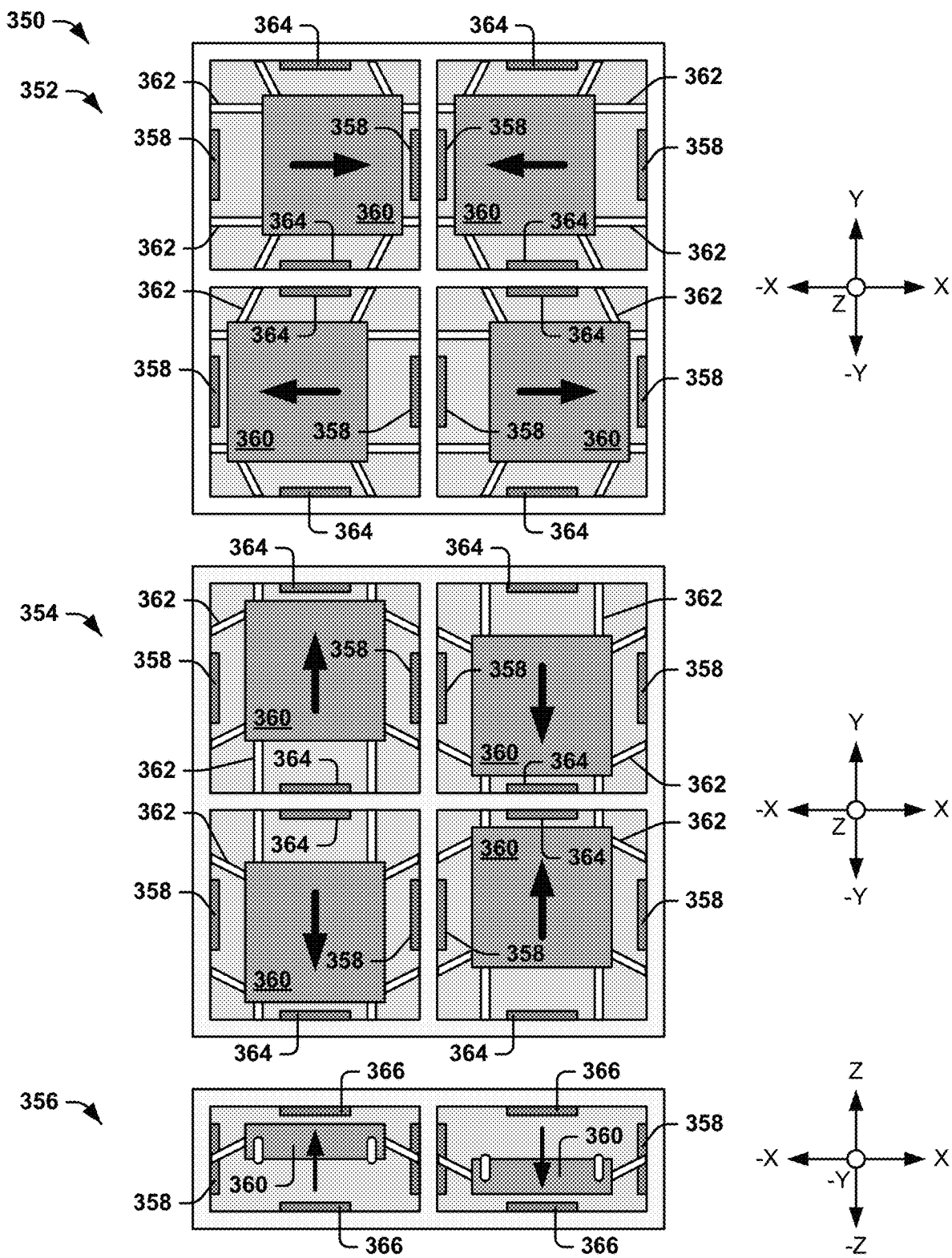
FIG. 8 illustrates another example diagram of motion of a sensor system.

FIG. 8 illustrates another example diagram 350 of motion of sensor systems 352, 354, and 356. The diagram 350 can correspond to the gyroscope system 300 in the example of FIG. 7, with the first sensor system 352 corresponding to the first sensor system 302, the second sensor system 354 corresponding to the second sensor system 304, and the third sensor system 356 corresponding to the third sensor system 306. Therefore, reference is to be made to the example of FIG. 7 in the following description of the example of FIG. 8.

The diagram 350 includes motion of the first sensor system 352, in which the drive signal(s) DRV are provided to sets of X-axis electrodes 358 to provide in-plane periodic oscillatory motion of vibrating-masses 360 along the X-axis. In the example of FIG. 8, the vibrating-masses 358 are demonstrated as being out-of-phase by approximately 180° with respect to each pair of the vibrating-masses 360, such that each pair of vibrating-masses 360 is concurrently moving in both +X direction and the X direction. Similar to as described previously, the drive signal(s) $DRV_{X1}$ can include a single signal provided to a given one of the sets of X-axis electrodes 358 to provide an attractive electrostatic force in one direction (e.g., the +X direction) in one phase, and spring flexures 362 provide a reactionary motion of the vibrating-masses 360 in the opposite direction at an opposite (e.g., 180°) phase. As another example, the drive signal(s)

DRV$_{X1}$ can include a pair of drive signals DRV$_{X1}$ that are provided 180° out-of-phase with respect to each other to provide an attractive electrostatic force in each of the X-axis respective directions at each of opposite phases. As an example, while the gyroscope controller 14 provides the drive signal(s) DRV$_{X1}$ to the sets of X-axis electrodes 358, the gyroscope controller 14 can provide first force-rebalance signals FRB$_{Y1}$ to sets of Y-axis electrodes 364 and second force-rebalance signals FRB$_{Z1}$ to the sets of Z-axis electrodes 366 to maintain the vibrating-masses 360 in the null position along the respective Y and Z sense-axes.

The diagram 350 includes motion of the second sensor system 354, in which the drive signal(s) DRV$_{Y2}$ are provided to the sets of Y-axis electrodes 364 to provide in-plane periodic oscillatory motion of vibrating-masses 360 along the Y-axis. In the example of FIG. 8, the vibrating-masses 358 are demonstrated as being out-of-phase by approximately 180° with respect to each pair of the vibrating-masses 360, such that each pair of vibrating-masses 360 is concurrently moving in both+Y direction and the Y direction. Similar to as described previously, the drive signal(s) DRV$_{Y2}$ can include a single signal provided to a given one of the sets of Y-axis electrodes 364 to provide an attractive electrostatic force in one direction (e.g., the +Y direction) in one phase, and spring flexures 362 provide a reactionary motion of the vibrating-masses 360 in the opposite direction at an opposite (e.g., 180°) phase. As another example, the drive signal(s) DRV$_{Y2}$ can include a pair of drive signals DRV$_{Y2}$ that are provided 180° out-of-phase with respect to each other to provide an attractive electrostatic force in each of the Y-axis respective directions at each of opposite phases. As an example, while the gyroscope controller 14 provides the drive signal(s) DRV$_{Y2}$ to the sets of Y-axis electrodes 364, the gyroscope controller 14 can provide first force-rebalance signals FRB$_{X2}$ to the sets of X-axis electrodes 358 and second force-rebalance signals FRB$_{Z2}$ to the sets of Z-axis electrodes 366 to maintain the vibrating-masses 360 in the null position along the respective X and Z sense-axes.

The diagram 350 includes motion of the third sensor system 356, in which the drive signal(s) DRV$_{Z3}$ are provided to sets of Z-axis electrodes 366 to provide in-plane periodic oscillatory motion of vibrating-masses 360 along the Z-axis. In the example of FIG. 8, the vibrating-masses 358 are demonstrated as being out-of-phase by approximately 180° with respect to each pair of the vibrating-masses 360, such that each pair of vibrating-masses 360 is concurrently moving in both+Z direction and the Z direction. Similar to as described previously, the drive signal(s) DRV$_{Z3}$ can include a single signal provided to a given one of the sets of Z-axis electrodes 366 to provide an attractive electrostatic force in one direction (e.g., the +Z direction) in one phase, and the spring flexures 362 provide a reactionary motion of the vibrating-masses 360 in the opposite direction at an opposite (e.g., 180°) phase. As another example, the drive signal(s) DRV$_{Z3}$ can include a pair of drive signals DRV$_{Z3}$ that are provided 180° out-of-phase with respect to each other to provide an attractive electrostatic force in each of the Z-axis respective directions at each of opposite phases. As an example, while the gyroscope controller 14 provides the drive signal(s) DRV$_{Z3}$ to the sets of Z-axis electrodes 366, the gyroscope controller 14 can provide first force-rebalance signals FRB$_{X3}$ to sets of X-axis electrodes 358 and second force-rebalance signals FRB$_{Y3}$ to the sets of Y-axis electrodes 364 to maintain the vibrating-masses 360 in the null position along the respective X and Y sense-axes.

As an example, the sensor systems 352, 354, and 356 can be provided the respective drive signals DRV$_{X1}$, DRV$_{Y2}$, and DRV$_{Y3}$ signals concurrently, and can likewise be provided the force-rebalance signals FRB$_{Y1}$ and FRB$_{Z1}$, the force-rebalance signals FRB$_{X2}$ and FRB$_{Z2}$, and the force-rebalance signals FRB$_{X3}$ and FRB$_{Y3}$ concurrently. Therefore, the gyroscope system 350 can be configured to measure the rate of rotation ROT about the Y and Z-axes based on the force-rebalance signals FRB$_{Y1}$ and FRB$_{Z1}$ associated with the first sensor system 352, can measure the rate of rotation ROT about the X and Z-axes based on the force-rebalance signals FRB$_{X2}$ and FRB$_{Z2}$ associated with the second sensor system 354, and can measure the rate of rotation ROT about the X and Y-axes based on the force-rebalance signals FRB$_{X3}$ and FRB$_{Y3}$ associated with the third sensor system 356. Accordingly, the gyroscope system 350 can be configured to concurrently calculate the rate of rotation of the gyroscope system 350 about all three orthogonal axes concurrently. Additionally, the sensor systems 352, 354, and 356 can be fabricated on a common plane, such that the gyroscope system 350 can be fabricated in a compact and planar arrangement to reduce space.

As described previously, implementing the redundant sensor systems 352, 354, and 356 can facilitate calibration of the respective sensor systems 12 about the given one of the orthogonal axes. For example, calculation of the rotation rate ROT about a given one of the orthogonal axes is based on a vector cross-product between the rotation about the respective one of the orthogonal axes and the drive mode vibration of the vibrating-mass(es) 360 along the respective drive axis. When the gyroscope controller 14 cycles between different drive axes for a given one of the sensor systems 352, 354, and 356, the vector cross-product changes polarity based on the cross-product function variable switch. As a result, for a given one of the orthogonal axes, the rate of rotation about that orthogonal axis can be calculated differentially, and thus with opposite polarity, with respect to two different periods of time in which the drive axis has changed from one axis to another. As a result, any bias errors associated with the respective one of the sensor systems 352, 354, and 356 with respect to the given drive axis is substantially canceled in an equal and opposite manner between the rate of rotation ROT calculations of the two different time periods. As a result, the gyroscope system 350 can be calibrated over a cycle of respective changes of drive axis for each of the sensor systems 352, 354, and 356, as demonstrated in the following examples of FIGS. 9-17.

The examples of FIGS. 9-17 each demonstrate three sensor systems, labeled "SENSOR SYSTEM 1", "SENSOR SYSTEM 2", and "SENSOR SYSTEM 3", that can correspond respectively to three sensor systems as described previously (e.g., the sensor systems 352, 354, and 356, respectively). Each of the examples of FIGS. 9-17 can correspond to different time periods that can occur during a complete calibration of the gyroscope system that includes the respective sensor systems. Therefore, the following description of the examples of FIGS. 9-17 can collectively correspond to a sequence of calibration of a respective gyroscope system (e.g., the gyroscope system 350). In the examples of FIGS. 9-17, the sensor systems are demonstrated only by the respective three orthogonal axes, in which either the drive axis is changing, the drive signal DRV is being applied to the respective electrodes, or the force-rebalance signals are being applied to the respective electrodes to measure the rate of rotation Ω about the respective axis, as provided herein.

Figure 9:
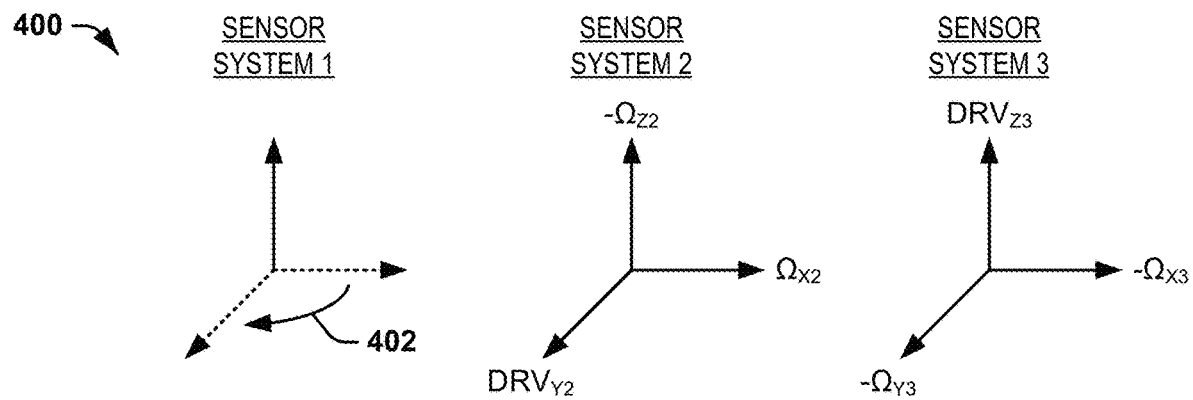
FIG. 9 illustrates an example diagram of a first calibration time period.

FIG. 9 illustrates an example diagram 400 of a first calibration time period. In the first calibration time period, the first sensor system is demonstrated as changing the drive axis from the X-axis to the Y-axis, as demonstrated by the dashed lines of the respective X and Y-axes, and by the arrow 402 demonstrating the transition. As an example, the Y-axis can begin having the Y-axis drive signal $DRV_{Y1}$ being provided after having been provided the X-axis drive signal $DRV_{X1}$ in the immediately preceding time period (e.g., immediately prior to the first calibration time period). Additionally, as an example, the X-axis electrodes can have the force-rebalance signals $FRB_{X1}$ provided to null the vibrating-mass(es) with respect to the X-axis, and can have the force-rebalance signal $FRB_{Z1}$ provided to maintain the vibrating-mass(es) nulled with respect to the Z-axis from the immediately preceding time period (e.g., immediately prior to the first calibration time period). Therefore, the first sensor system is not facilitating calculation of a rate of rotation ROT during the first calibration time period.

The diagram 400 also demonstrates a normal operating condition of the second sensor system. In the first calibration time period, the second sensor system is provided the Y-axis drive signal $DRV_{Y2}$ to provide the in-plane periodic oscillatory motion of the vibrating-mass(es) along the Y-axis corresponding to the drive axis. Additionally, the second sensor system is provided force-rebalance signals $FRB_{X2}$ and $FRB_{Z2}$ to facilitate calculation of the rate of rotation $\Omega_X$ about the respective X-axis and the rate of rotation $\Omega_Z$ about the Z-axis. As described previously, the rate of rotation is calculated based on a vector cross-product of the drive axis and the respective sense axis. Therefore, in the example of FIG. 9, the second sensor system provides a positive rate of rotation $+\Omega_{X2}$ about the X-axis and a negative rate of rotation $-\Omega_{Z2}$ about the Z-axis.

Similarly, the diagram 400 further demonstrates a normal operating condition of the third sensor system. In the first calibration time period, the third sensor is provided the Z-axis drive signal $DRV_{Z3}$ to provide the in-plane periodic oscillatory motion of the vibrating-mass(es) along the Z-axis corresponding to the drive axis. Additionally, the third sensor system is provided force-rebalance signals $FRB_{X3}$ and $FRB_{Y3}$ to facilitate calculation of the rate of rotation $\Omega_X$ about the respective X-axis and the rate of rotation $\Omega_Y$ about the Y-axis. As described previously, the rate of rotation is calculated based on a vector cross-product of the drive axis and the respective sense axis. Therefore, in the example of FIG. 9, the third sensor system provides a negative rate of rotation $-\Omega_{X3}$ about the X-axis and a negative rate of rotation $-\Omega_{Y3}$ about the Y-axis.

Figure 10:
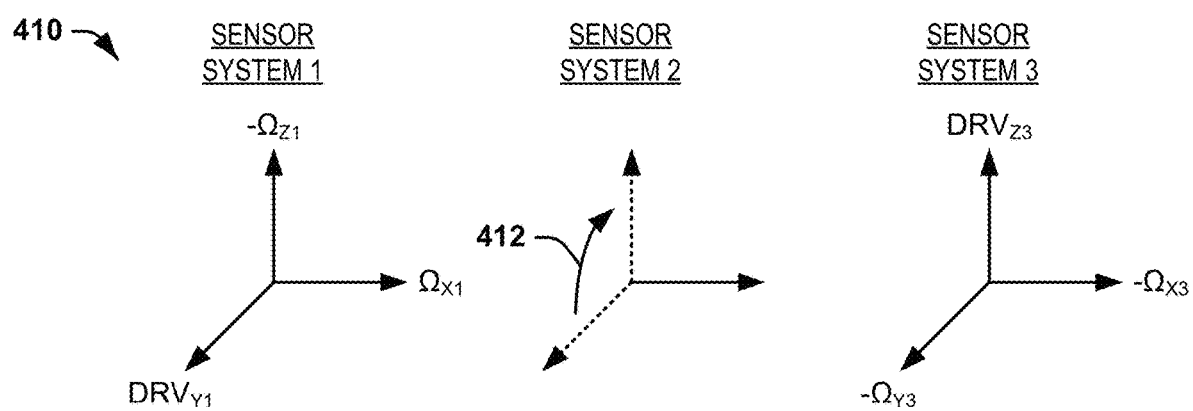
FIG. 10 illustrates an example diagram of a second calibration time period.

FIG. 10 illustrates an example diagram 410 of a second calibration time period. The second calibration time period can immediately proceed the first calibration time period demonstrated by the diagram 400 in the example of FIG. 9, such as in response to a full transition of the drive and sense axes of the first sensor system in the diagram 400. The diagram 410 demonstrates a normal operating condition of the first sensor system. In the second calibration time period, after changing the drive axis in the first calibration time period, the first sensor system is provided the Y-axis drive signal $DRV_{Y1}$ to provide the in-plane periodic oscillatory motion of the vibrating-mass(es) along the Y-axis corresponding to the drive axis. Additionally, the first sensor system is provided force-rebalance signals $FRB_{X1}$ and $FRB_{Z1}$ to facilitate calculation of the rate of rotation $\Omega_X$ about the respective X-axis and the rate of rotation $\Omega_Z$ about the Z-axis. In the example of FIG. 10, the first sensor system provides a positive rate of rotation $+\Omega_{X1}$ about the X-axis and a negative rate of rotation $-\Omega_{Z1}$ about the Z-axis.

In the second calibration time period, the second sensor system is demonstrated as changing the drive axis from the Y-axis to the Z-axis, as demonstrated by the dashed lines of the respective Y and Z-axes, and by the arrow 412 demonstrating the transition. As an example, the Z-axis can begin having the Z-axis drive signal $DRV_{Z2}$ being provided after having been provided the Y-axis drive signal $DRV_{Y2}$ in the first calibration time period. Additionally, as an example, the Y-axis electrodes can have the force-rebalance signals $FRB_{Y2}$ provided to null the vibrating-mass(es) with respect to the Y-axis, and can have the force-rebalance signal $FRB_{Z2}$ provided to maintain the vibrating-mass(es) nulled with respect to the Z-axis from the first calibration time period. Therefore, the second sensor system is not facilitating calculation of a rate of rotation ROT during the second calibration time period.

The diagram 410 further demonstrates the normal operating condition of the third sensor system. In the second calibration time period, the third sensor is provided the Z-axis drive signal $DRV_{Z3}$ to provide the in-plane periodic oscillatory motion of the vibrating-mass(es) along the Z-axis corresponding to the drive axis. Additionally, the third sensor system is provided force-rebalance signals $FRB_{X3}$ and $FRB_{Y3}$ to facilitate calculation of the rate of rotation $\Omega_X$ about the respective X-axis and the rate of rotation $\Omega_Y$ about the Y-axis. In the example of FIG. 10, the third sensor system provides a negative rate of rotation $-\Omega_{X3}$ about the X-axis and a negative rate of rotation $-\Omega_{Y3}$ about the Y-axis.

Figure 11:
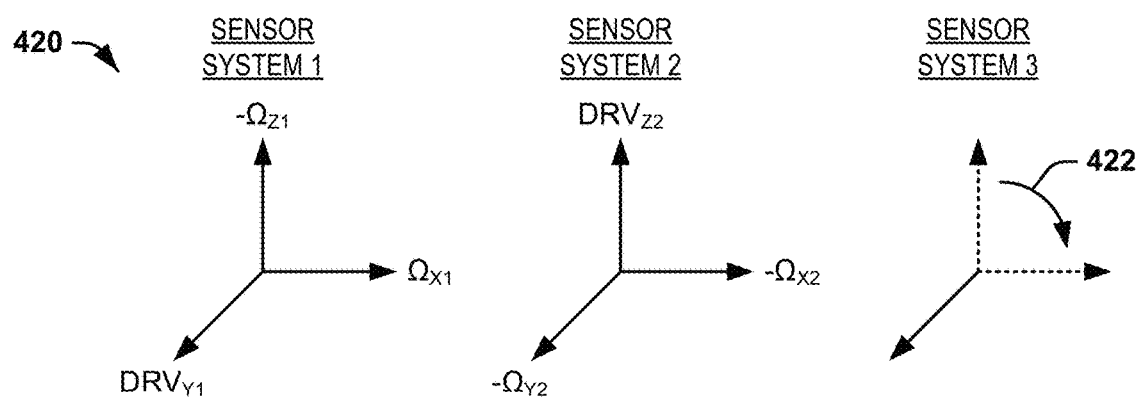
FIG. 11 illustrates an example diagram of a third calibration time period.

FIG. 11 illustrates an example diagram 420 of a third calibration time period. The third calibration time period can immediately proceed the second calibration time period demonstrated by the diagram 410 in the example of FIG. 10, such as in response to a full transition of the drive and sense axes of the second sensor system in the diagram 410. The diagram 420 demonstrates a normal operating condition of the first sensor system. In the third calibration time period, the first sensor system is provided the Y-axis drive signal $DRV_{Y1}$ to provide the in-plane periodic oscillatory motion of the vibrating-mass(es) along the Y-axis corresponding to the drive axis. Additionally, the first sensor system is provided force-rebalance signals $FRB_{X1}$ and $FRB_{Z1}$ to facilitate calculation of the rate of rotation $\Omega_Y$ about the respective Y-axis and the rate of rotation $\Omega_Z$ about the Z-axis. In the example of FIG. 11, the first sensor system provides a positive rate of rotation $+\Omega_{X1}$ about the X-axis and a negative rate of rotation $-\Omega_{Z1}$ about the Z-axis.

Similarly, the diagram 420 further demonstrates the normal operating condition of the second sensor system. In the third calibration time period, after changing the drive axis in the second calibration time period, the second sensor is provided the Z-axis drive signal $DRV_{Z2}$ to provide the in-plane periodic oscillatory motion of the vibrating-mass(es) along the Z-axis corresponding to the drive axis. Additionally, the second sensor system is provided force-rebalance signals $FRB_{X2}$ and $FRB_{Y2}$ to facilitate calculation of the rate of rotation $\Omega_X$ about the respective X-axis and the rate of rotation $\Omega_Y$ about the Y-axis. In the example of FIG. 11, the second sensor system provides a negative rate of rotation $-\Omega_{X2}$ about the X-axis and a negative rate of rotation $-\Omega_{Y2}$ about the Y-axis.

In the third calibration time period, the third sensor system is demonstrated as changing the drive axis from the Z-axis to the X-axis, as demonstrated by the dashed lines of the respective X and Z-axes, and by the arrow 422 demonstrating the transition. As an example, the X-axis can begin having the X-axis drive signal $DRV_{X3}$ being provided after having been provided the Z-axis drive signal $DRV_{Z3}$ in the second calibration time period. Additionally, as an example, the Z-axis electrodes can have the force-rebalance signals $FRB_{Z3}$ provided to null the vibrating-mass(es) with respect to the Z-axis, and can have the force-rebalance signal $FRB_{Y3}$ provided to maintain the vibrating-mass(es) nulled with respect to the Y-axis from the second calibration time period. Therefore, the third sensor system is not facilitating calculation of a rate of rotation ROT during the third calibration time period.

Figure 12:
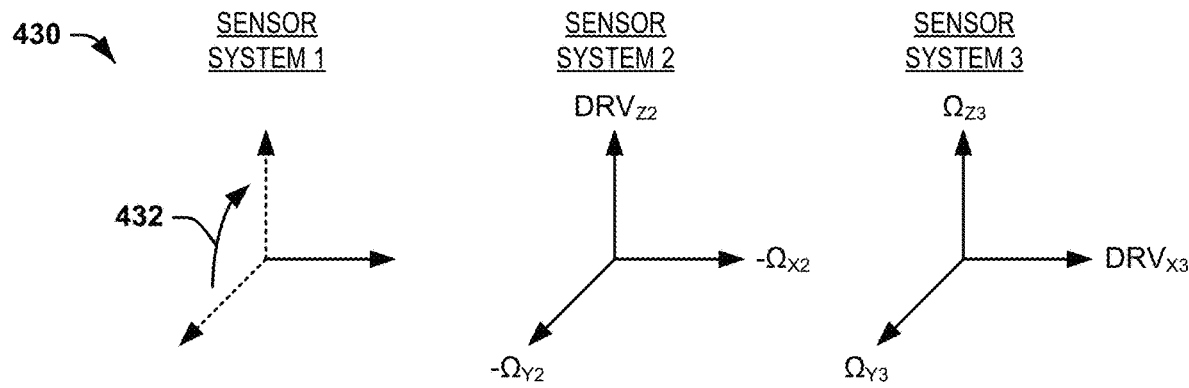
FIG. 12 illustrates an example diagram of a fourth calibration time period.

FIG. 12 illustrates an example diagram 430 of a fourth calibration time period. The fourth calibration time period can immediately proceed the third calibration time period demonstrated by the diagram 420 in the example of FIG. 11, such as in response to a full transition of the drive and sense axes of the third sensor system in the diagram 420. In the fourth calibration time period, the first sensor system is demonstrated as changing the drive axis from the Y-axis to the Z-axis, as demonstrated by the dashed lines of the respective Y and Z-axes, and by the arrow 432 demonstrating the transition. As an example, the Z-axis can begin having the Z-axis drive signal $DRV_{Z1}$ being provided after having been provided the Y-axis drive signal $DRV_{Y1}$ in the third calibration time period. Additionally, as an example, the Y-axis electrodes can have the force-rebalance signals $FRB_{Y1}$ provided to null the vibrating-mass(es) with respect to the Y-axis, and can have the force-rebalance signal $FRB_{X1}$ provided to maintain the vibrating-mass(es) nulled with respect to the X-axis from the third calibration time period. Therefore, the first sensor system is not facilitating calculation of a rate of rotation ROT during the fourth calibration time period.

The diagram 430 also demonstrates a normal operating condition of the second sensor system. In the fourth calibration time period, the second sensor is provided the Z-axis drive signal $DRV_{Z2}$ to provide the in-plane periodic oscillatory motion of the vibrating-mass(es) along the Z-axis corresponding to the drive axis. Additionally, the second sensor system is provided force-rebalance signals $FRB_{X2}$ and $FRB_{Y2}$ to facilitate calculation of the rate of rotation $\Omega_X$ about the respective X-axis and the rate of rotation $\Omega_Y$ about the Y-axis. In the example of FIG. 11, the second sensor system provides a negative rate of rotation $-\Omega_{X2}$ about the X-axis and a negative rate of rotation $-\Omega_{Y2}$ about the Y-axis.

Similarly, the diagram 430 further demonstrates a normal operating condition of the third sensor system. In the fourth calibration time period, after changing the drive axis in the third calibration time period, the third sensor is provided the X-axis drive signal $DRV_{X3}$ to provide the in-plane periodic oscillatory motion of the vibrating-mass(es) along the X-axis corresponding to the drive axis. Additionally, the third sensor system is provided force-rebalance signals $FRB_{Y3}$ and $FRB_{Z3}$ to facilitate calculation of the rate of rotation $\Omega_Y$ about the respective Y-axis and the rate of rotation $\Omega_Z$ about the Z-axis. In the example of FIG. 12, the third sensor system provides a positive rate of rotation $+\Omega_{Y3}$ about the X-axis and a positive rate of rotation $+\Omega_{Z3}$ about the Z-axis.

Figure 13:
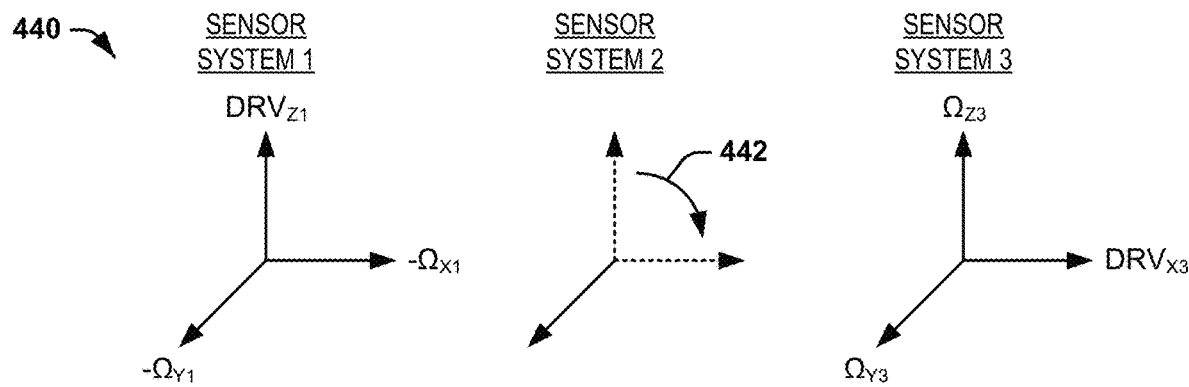
FIG. 13 illustrates an example diagram of a fifth calibration time period.

FIG. 13 illustrates an example diagram 440 of a fifth calibration time period. The fifth calibration time period can immediately proceed the fourth calibration time period demonstrated by the diagram 430 in the example of FIG. 12, such as in response to a full transition of the drive and sense axes of the first sensor system in the diagram 430. The diagram 440 demonstrates a normal operating condition of the first sensor system. In the fifth calibration time period, after changing the drive axis in the fourth calibration time period, the first sensor system is provided the Z-axis drive signal $DRV_{Z1}$ to provide the in-plane periodic oscillatory motion of the vibrating-mass(es) along the Z-axis corresponding to the drive axis. Additionally, the first sensor system is provided force-rebalance signals $FRB_{X1}$ and $FRB_{Y1}$ to facilitate calculation of the rate of rotation $\Omega_X$ about the respective X-axis and the rate of rotation Sty about the Y-axis. In the example of FIG. 13, the first sensor system provides a negative rate of rotation $-\Omega_{X1}$ about the X-axis and a negative rate of rotation $-\Omega_{Y1}$ about the Y-axis.

In the fifth calibration time period, the second sensor system is demonstrated as changing the drive axis from the Z-axis to the X-axis, as demonstrated by the dashed lines of the respective Y and Z-axes, and by the arrow 442 demonstrating the transition. As an example, the X-axis can begin having the X-axis drive signal $DRV_{X2}$ being provided after having been provided the Z-axis drive signal $DRV_{Z2}$ in the fourth calibration time period. Additionally, as an example, the Z-axis electrodes can have the force-rebalance signals $FRB_{Z2}$ provided to null the vibrating-mass(es) with respect to the Z-axis, and can have the force-rebalance signal $FRB_{Y2}$ provided to maintain the vibrating-mass(es) nulled with respect to the Y-axis from the fourth calibration time period. Therefore, the second sensor system is not facilitating calculation of a rate of rotation ROT during the fifth calibration time period.

The diagram 440 further demonstrates the normal operating condition of the third sensor system. In the fifth calibration time period, the third sensor is provided the X-axis drive signal $DRV_{X3}$ to provide the in-plane periodic oscillatory motion of the vibrating-mass(es) along the X-axis corresponding to the drive axis. Additionally, the third sensor system is provided force-rebalance signals $FRB_{Y3}$ and $FRB_{Z3}$ to facilitate calculation of the rate of rotation $\Omega_Y$ about the respective Y-axis and the rate of rotation $\Omega_Z$ about the Z-axis. In the example of FIG. 13, the third sensor system provides a positive rate of rotation $+\Omega_{Y3}$ about the Y-axis and a positive rate of rotation $+\Omega_{Z3}$ about the Z-axis.

Figure 14:
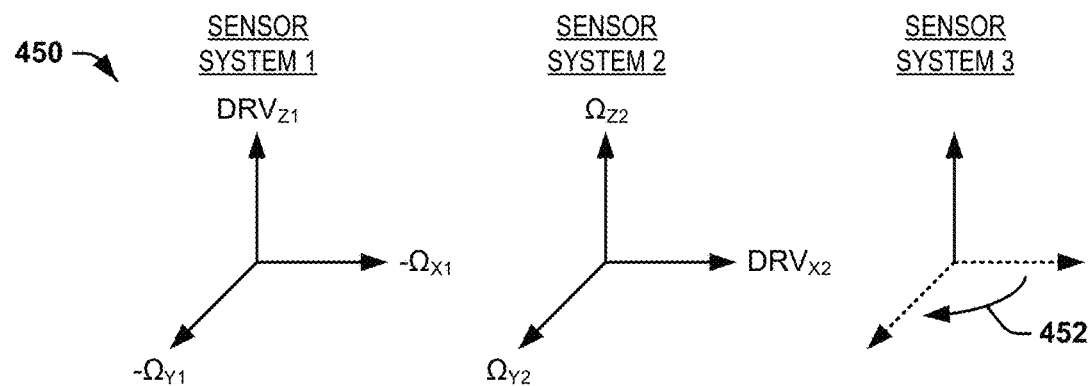
FIG. 14 illustrates an example diagram of a sixth calibration time period.

FIG. 14 illustrates an example diagram 450 of a sixth calibration time period. The sixth calibration time period can immediately proceed the fifth calibration time period demonstrated by the diagram 450 in the example of FIG. 13, such as in response to a full transition of the drive and sense axes of the second sensor system in the diagram 440. The diagram 450 demonstrates a normal operating condition of the first sensor system. In the sixth calibration time period, the first sensor system is provided the Z-axis drive signal $DRV_{Z1}$ to provide the in-plane periodic oscillatory motion of the vibrating-mass(es) along the Z-axis corresponding to the drive axis. Additionally, the first sensor system is provided force-rebalance signals $FRB_{X1}$ and $FRB_{Y1}$ to facilitate calculation of the rate of rotation $\Omega_X$ about the respective X-axis and the rate of rotation $\Omega_Y$ about the Y-axis. In the example of FIG. 14, the first sensor system provides a negative rate of rotation $-\Omega_{X1}$ about the X-axis and a negative rate of rotation $-\Omega_{Y1}$ about the Y-axis.

Similarly, the diagram 450 further demonstrates the normal operating condition of the second sensor system. In the sixth calibration time period, after changing the drive axis in the fifth calibration time period, the second sensor is provided the X-axis drive signal $DRV_{X2}$ to provide the in-plane periodic oscillatory motion of the vibrating-mass(es) along the X-axis corresponding to the drive axis. Additionally, the second sensor system is provided force-rebalance signals $FRB_{Y2}$ and $FRB_{Z2}$ to facilitate calculation of the rate of rotation $\Omega_Y$ about the respective Y-axis and the rate of rotation $\Omega_Z$ about the Z-axis. In the example of FIG. 14, the second sensor system provides a positive rate of rotation $+\Omega_{Y2}$ about the Y-axis and a positive rate of rotation $+\Omega_{Z2}$ about the Z-axis.

In the sixth calibration time period, the third sensor system is demonstrated as changing the drive axis from the X-axis to the Y-axis, as demonstrated by the dashed lines of the respective X and Y-axes, and by the arrow 452 demonstrating the transition. As an example, the Y-axis can begin having the Y-axis drive signal $DRV_{Y3}$ being provided after having been provided the X-axis drive signal $DRV_{X3}$ in the fifth calibration time period. Additionally, as an example, the X-axis electrodes can have the force-rebalance signals $FRB_{X3}$ provided to null the vibrating-mass(es) with respect to the X-axis, and can have the force-rebalance signal $FRB_{Z3}$ provided to maintain the vibrating-mass(es) nulled with respect to the Z-axis from the second calibration time period. Therefore, the third sensor system is not facilitating calculation of a rate of rotation ROT during the sixth calibration time period.

Figure 15:
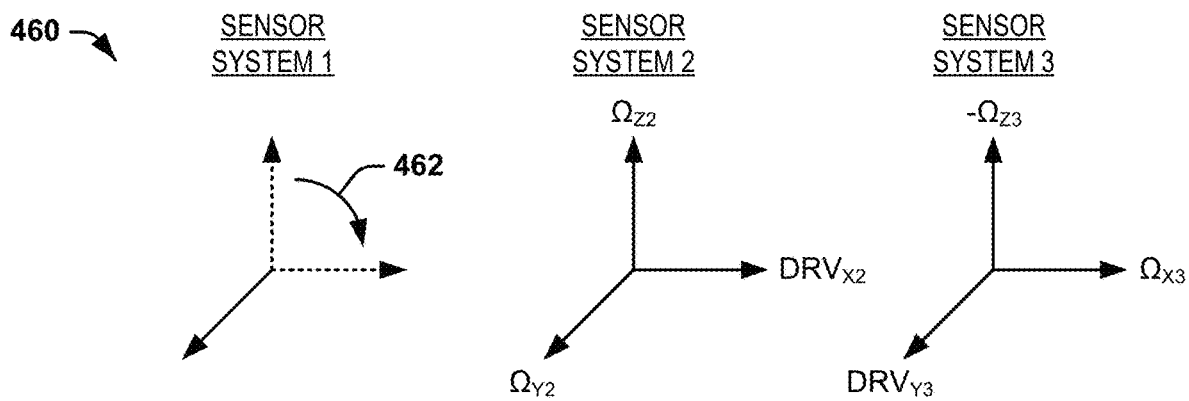
FIG. 15 illustrates an example diagram of a seventh calibration time period.

FIG. 15 illustrates an example diagram 460 of a seventh calibration time period. The seventh calibration time period can immediately proceed the sixth calibration time period demonstrated by the diagram 450 in the example of FIG. 14, such as in response to a full transition of the drive and sense axes of the third sensor system in the diagram 450. In the seventh calibration time period, the first sensor system is demonstrated as changing the drive axis from the Z-axis to the X-axis, as demonstrated by the dashed lines of the respective X and Z-axes, and by the arrow 462 demonstrating the transition. As an example, the X-axis can begin having the X-axis drive signal $DRV_{X1}$ being provided after having been provided the Z-axis drive signal $DRV_{Z1}$ in the sixth calibration time period. Additionally, as an example, the Z-axis electrodes can have the force-rebalance signals $FRB_{Z1}$ provided to null the vibrating-mass(es) with respect to the Z-axis, and can have the force-rebalance signal $FRB_{Y1}$ provided to maintain the vibrating-mass(es) nulled with respect to the Y-axis from the sixth calibration time period. Therefore, the first sensor system is not facilitating calculation of a rate of rotation ROT during the seventh calibration time period.

The diagram 460 also demonstrates a normal operating condition of the second sensor system. In the seventh calibration time period, the second sensor is provided the X-axis drive signal $DRV_{X2}$ to provide the in-plane periodic oscillatory motion of the vibrating-mass(es) along the X-axis corresponding to the drive axis. Additionally, the second sensor system is provided force-rebalance signals $FRB_{Y2}$ and $FRB_{Z2}$ to facilitate calculation of the rate of rotation Sty about the respective Y-axis and the rate of rotation $\Omega_Z$ about the Z-axis. In the example of FIG. 15, the second sensor system provides a positive rate of rotation $+\Omega_{Y2}$ about the Y-axis and a positive rate of rotation $+\Omega_{Z2}$ about the Z-axis.

Similarly, the diagram 460 further demonstrates a normal operating condition of the third sensor system. In the seventh calibration time period, after changing the drive axis in the sixth calibration time period, the third sensor is provided the Y-axis drive signal $DRV_{Y3}$ to provide the in-plane periodic oscillatory motion of the vibrating-mass(es) along the Y-axis corresponding to the drive axis. Additionally, the third sensor system is provided force-rebalance signals $FRB_{X3}$ and $FRB_{Z3}$ to facilitate calculation of the rate of rotation $\Omega_X$ about the respective X-axis and the rate of rotation $\Omega_Z$ about the Z-axis. In the example of FIG. 15, the third sensor system provides a positive rate of rotation $+\Omega_{X3}$ about the X-axis and a negative rate of rotation $-\Omega_{Z3}$ about the Z-axis.

Figure 16:
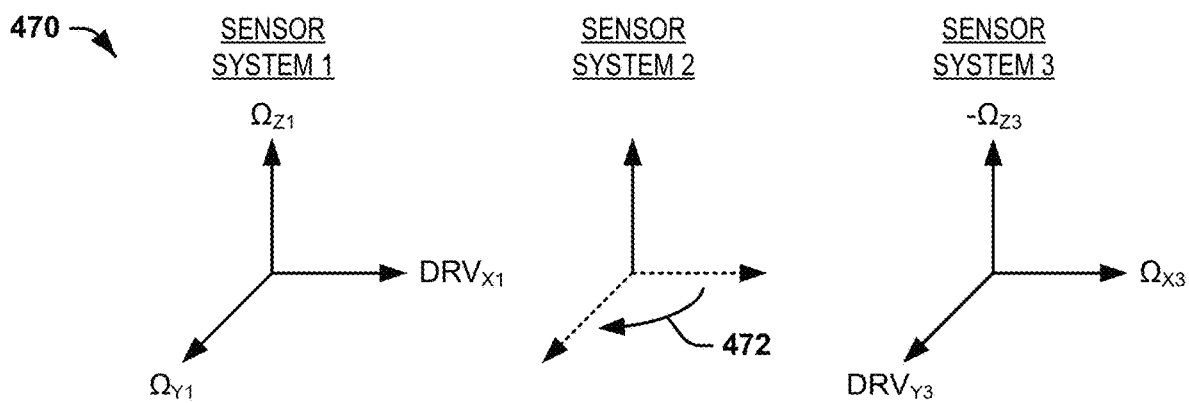
FIG. 16 illustrates an example diagram of an eighth calibration time period.

FIG. 16 illustrates an example diagram 470 of an eighth calibration time period. The eighth calibration time period can immediately proceed the seventh calibration time period demonstrated by the diagram 460 in the example of FIG. 15, such as in response to a full transition of the drive and sense axes of the first sensor system in the diagram 460. The diagram 470 demonstrates a normal operating condition of the first sensor system. In the eighth calibration time period, after changing the drive axis in the seventh calibration time period, the first sensor system is provided the X-axis drive signal $DRV_{X1}$ to provide the in-plane periodic oscillatory motion of the vibrating-mass(es) along the X-axis corresponding to the drive axis. Additionally, the first sensor system is provided force-rebalance signals $FRB_{Y1}$ and $FRB_{Z1}$ to facilitate calculation of the rate of rotation $\Omega_Y$ about the respective Y-axis and the rate of rotation $\Omega_Z$ about the Z-axis. In the example of FIG. 16, the first sensor system provides a positive rate of rotation $+\Omega_{Y1}$ about the Y-axis and a positive rate of rotation $+\Omega_{Z1}$ about the Z-axis.

In the eighth calibration time period, the second sensor system is demonstrated as changing the drive axis from the X-axis to the Y-axis, as demonstrated by the dashed lines of the respective X and Y-axes, and by the arrow 472 demonstrating the transition. As an example, the Y-axis can begin having the Y-axis drive signal $DRV_{Y2}$ being provided after having been provided the X-axis drive signal $DRV_{X2}$ in the seventh calibration time period. Additionally, as an example, the X-axis electrodes can have the force-rebalance signals $FRB_{X2}$ provided to null the vibrating-mass(es) with respect to the X-axis, and can have the force-rebalance signal $FRB_{Z2}$ provided to maintain the vibrating-mass(es) nulled with respect to the Z-axis from the seventh calibration time period. Therefore, the second sensor system is not facilitating calculation of a rate of rotation ROT during the eighth calibration time period.

The diagram 470 further demonstrates the normal operating condition of the third sensor system. In the eighth calibration time period, the third sensor is provided the Y-axis drive signal $DRV_{Y3}$ to provide the in-plane periodic oscillatory motion of the vibrating-mass(es) along the Y-axis corresponding to the drive axis. Additionally, the third sensor system is provided force-rebalance signals $FRB_{X3}$ and $FRB_{Z3}$ to facilitate calculation of the rate of rotation $\Omega_X$ about the respective X-axis and the rate of rotation $\Omega_Z$ about the Z-axis. In the example of FIG. 16, the third sensor system provides a positive rate of rotation $+\Omega_{X3}$ about the X-axis and a negative rate of rotation $-\Omega_{Z3}$ about the Z-axis.

Figure 17:
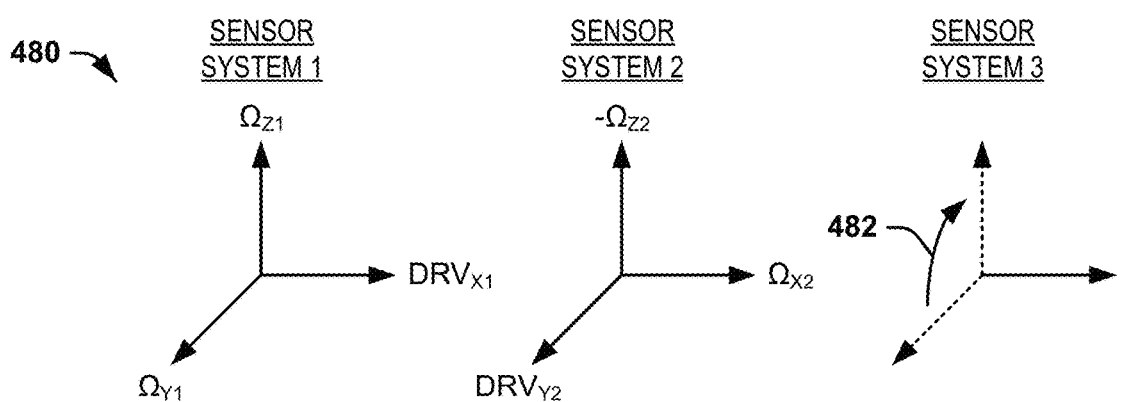
FIG. 17 illustrates an example diagram of a ninth calibration time period.

FIG. 17 illustrates an example diagram 480 of a ninth calibration time period. The ninth calibration time period can immediately proceed the eighth calibration time period demonstrated by the diagram 480 in the example of FIG. 16, such as in response to a full transition of the drive and sense axes of the second sensor system in the diagram 470. The diagram 480 demonstrates a normal operating condition of the first sensor system. In the ninth calibration time period, the first sensor system is provided the X-axis drive signal $DRV_{X1}$ to provide the in-plane periodic oscillatory motion of the vibrating-mass(es) along the X-axis corresponding to the drive axis. Additionally, the first sensor system is provided force-rebalance signals $FRB_{Y1}$ and $FRB_{Z1}$ to facilitate calculation of the rate of rotation $\Omega_Y$ about the respective Y-axis and the rate of rotation $\Omega_Z$ about the Z-axis. In the example of FIG. 17, the first sensor system provides a positive rate of rotation $+\Omega_{Y1}$ about the Y-axis and a positive rate of rotation $+\Omega_{Z1}$ about the Z-axis.

Similarly, the diagram 480 further demonstrates the normal operating condition of the second sensor system. In the ninth calibration time period, after changing the drive axis in the eighth calibration time period, the second sensor is provided the Y-axis drive signal $DRV_{Y2}$ to provide the in-plane periodic oscillatory motion of the vibrating-mass(es) along the Y-axis corresponding to the drive axis. Additionally, the second sensor system is provided force-rebalance signals $FRB_{X2}$ and $FRB_{Z2}$ to facilitate calculation of the rate of rotation $\Omega_X$ about the respective X-axis and the rate of rotation $\Omega_Z$ about the Z-axis. In the example of FIG. 17, the second sensor system provides a positive rate of rotation $+\Omega_{X2}$ about the X-axis and a negative rate of rotation $-\Omega_{Z2}$ about the Z-axis.

In the ninth calibration time period, the third sensor system is demonstrated as changing the drive axis from the Y-axis to the Z-axis, as demonstrated by the dashed lines of the respective Y and Z-axes, and by the arrow 482 demonstrating the transition. As an example, the Z-axis can begin having the Z-axis drive signal $DRV_{Z3}$ being provided after having been provided the Y-axis drive signal $DRV_{Y3}$ in the eighth calibration time period. Additionally, as an example, the Y-axis electrodes can have the force-rebalance signals $FRB_{Y3}$ provided to null the vibrating-mass(es) with respect to the Y-axis, and can have the force-rebalance signal $FRB_{X3}$ provided to maintain the vibrating-mass(es) nulled with respect to the X-axis from the second calibration time period. Therefore, the third sensor system is not facilitating calculation of a rate of rotation ROT during the ninth calibration time period.

The associated gyroscope system that includes the sensor systems of the examples of FIGS. 9-17 can thus continuously cycle through the nine calibration time periods, such that at a given time period, one of the three sensor systems is changing the drive axis. As an example, the gyroscope system can also include a normal operating mode, in which each of the three sensor systems has a separate orthogonal axis provided the drive signals DRV along a drive axis. Based on the rotation in drive axes and the respective differential measurements of a rate of rotation about a given one of the axes for a given one of the sensor systems, the gyroscope controller 14 can also be configured to calibrate the sensor systems. As an example, the processor 24 can be configured to identify bias errors based on the differential measurements of the rates of rotation, and can substantially cancel the bias errors from the calculations of the rates of rotation in real-time.

As an example, in the examples of FIGS. 10 and 11, the first sensor system provides a negative rate of rotation $-\Omega_{Z1}$ about the Z-axis, and in the examples of FIGS. 16 and 17, the first sensor system provides a positive rate of rotation $+\Omega_{Z1}$ about the Z-axis. Similarly, in the examples of FIGS. 10 and 11, the first sensor system provides a positive rate of rotation $+\Omega_{X1}$ about the X-axis, and in the examples of FIGS. 13 and 14, the first sensor system provides a negative rate of rotation $-\Omega_{X1}$ about the X-axis. Similarly, in the examples of FIGS. 13 and 14, the first sensor system provides a negative rate of rotation $\Omega_{Y1}$ about the Y-axis, and in the examples of FIGS. 16 and 17, the first sensor system provides a positive rate of rotation $+\Omega_{Y1}$ about the Y-axis. Therefore, the first sensor system is configured to provide both a positive and a negative rate of rotation $\Omega$ calculation of each of the three orthogonal axes in each of different respective time periods. As described previously, any bias errors associated with the respective one of the sensor systems (e.g., the sensor systems 352, 354, and 356) with respect to the given drive axis is substantially canceled in an equal and opposite manner between the rate of rotation ROT calculations of the two different time periods. As a result, the gyroscope controller 14 can be configured to calibrate the measurement of each of the rates of rotation $\Omega_{X1}$, $\Omega_{Y1}$, and $\Omega_{Z1}$ provided by the first sensor system over the course of the calibration time periods based on the differential measurements provided by the positive and negative rates of rotation. In other words, because the bias errors can be identified by the gyroscope controller 14 based on the differential measurements, the bias errors can be canceled in a given calculation of the rate of rotation of the sensor system at a given time.

Similarly, the second and third sensor systems can likewise be calibrated over the course of the nine calibration time periods. Particularly, the second sensor system can be calibrated with respect to rates of rotation about the X-axis based on the calculated rates of rotation $-\Omega_{X2}$ in the examples of FIGS. 11 and 12 relative to the calculated rates of rotation $+\Omega_{X2}$ in the examples of FIGS. 9 and 17, with respect to rates of rotation about the Y-axis based on the calculated rates of rotation $-\Omega_{Y2}$ in the examples of FIGS. 11 and 12 relative to the calculated rates of rotation $+\Omega_{Y2}$ in the examples of FIGS. 14 and 15, and with respect to rates of rotation about the Z-axis based on the calculated rates of rotation $-\Omega_{Z2}$ in the examples of FIGS. 9 and 17 relative to the calculated rates of rotation $+\Omega_{Z2}$ in the examples of FIGS. 14 and 15. Similarly, the third sensor system can be calibrated with respect to rates of rotation about the X-axis based on the calculated rates of rotation $-\Omega_{X3}$ in the examples of FIGS. 9 and 10 relative to the calculated rates of rotation $+\Omega_{X3}$ in the examples of FIGS. 15 and 16, with respect to rates of rotation about the Y-axis based on the calculated rates of rotation $-\Omega_{Y3}$ in the examples of FIGS. 9 and 10 relative to the calculated rates of rotation $+\Omega_{Y3}$ in the examples of FIGS. 12 and 13, and with respect to rates of rotation about the Z-axis based on the calculated rates of rotation $-\Omega_{Z3}$ in the examples of FIGS. 15 and 16 relative to the calculated rates of rotation $+\Omega_{Z3}$ in the examples of FIGS. 12 and 13. Accordingly, the gyroscope system 10 can be substantially continuously calibrated without interrupting normal operation of the gyroscope system 10 for calculating the rates of rotation of the gyroscope system 10 about all three orthogonal axes.

In view of the foregoing structural and functional features described above, a methodology in accordance with various aspects of the present invention will be better appreciated with reference to FIG. 18. While, for purposes of simplicity of explanation, the methodology of FIG. 18 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 18 illustrates an example of a method 500 for measuring rotation about each of three orthogonal axes via a gyroscope system (e.g., the gyroscope system 10). At 502, a drive signal (e.g., the drive signal DRV) is provided to a first electrode (e.g., one of the sets of electrodes 18, 20, 22) to provide a driving force to a vibrating-mass (e.g., the vibrating-mass 16) along a first axis of the three orthogonal axes during a first time period (e.g., the first calibration time period of diagram 400). At 504, a first force-rebalance signal (e.g., the force-rebalance signal FRB) is provided to a second electrode (e.g., another one of the sets of electrodes 18, 20, 22) to provide a first force-rebalance to the vibrating-mass in a second axis of the three orthogonal axes during the first time period to calculate a rotation of the gyroscope system about the second axis based on the first force-rebalance signal. At 506, a second force-rebalance signal is provided to a third electrode (e.g., another one of the sets of electrodes 18, 20, 22) to provide a second force-rebalance to the vibrating-mass in a third axis of the three orthogonal axes during the first time period to calculate a rotation of the gyroscope system about the third axis based on the second force-rebalance signal. At 508, the drive signal is provided to the second electrode to provide the driving force to the vibrating-mass along the second axis during a second time period (e.g., the second calibration time period of diagram 410). At 510, the first force-rebalance signal is provided to the first electrode to provide the first force-rebalance to the vibrating-mass in the first axis during the second time period to calculate a rotation of the gyroscope system about the first axis based on the first force-rebalance signal.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A gyroscope system comprising:
   a sensor system comprising a vibrating-mass and a plurality of electrodes each arranged to provide a driving force to the vibrating-mass in a first axis of three orthogonal axes and a force-rebalance to the vibrating-mass in a second axis and a third axis of the three orthogonal axes; and
   a gyroscope controller configured to generate a drive signal that is provided to a first electrode of the plurality of electrodes to provide the driving force to facilitate in-plane periodic oscillatory motion of the vibrating-mass along the first axis of the three orthogonal axes, and to generate a force-rebalance signal that is alternately provided to each of a second electrode and a third electrode of the plurality of electrodes associated with the respective second axis and the respective third axis of the three orthogonal axes to alternately calculate a rotation of the gyroscope system about the respective second axis and the respective third axis of the three orthogonal axes.

2. The system of claim 1, wherein the gyroscope controller is configured to alternate providing the drive signal to one of the plurality of electrodes associated with the first axis and to alternate providing the force-rebalance signal to the other of the plurality of electrodes in each of different time periods to calculate the rotation of the gyroscope system about the respective second axis and the respective third axis in each of the different periods.

3. The system of claim 2, wherein the gyroscope controller is configured to provide the drive signal to the first electrode while concurrently applying the force-rebalance signal to the second and third electrodes for calculation of the rotation of the gyroscope system about the respective second and third orthogonal axes during a first time period, to provide the drive signal to the second electrode while concurrently applying the force-rebalance signal to the first and third electrodes for calculation of the rotation of the gyroscope system about the respective first and third orthogonal axes during a second time period, and to provide the drive signal to the third electrode while concurrently applying the force-rebalance signal to the first and second electrodes for calculation of the rotation of the gyroscope system about the respective first and second orthogonal axes during a third time period.

4. The system of claim 1, wherein the sensor system comprises a plurality of vibrating-masses, the plurality of electrodes being arranged to provide one of a driving force and a force-rebalance to each of the plurality of vibrating-masses in each of the three orthogonal axes.

5. The system of claim 4, wherein the plurality of vibrating-masses comprises a pair of vibrating-masses, wherein the gyroscope controller is configured to generate the drive signal that is provided to the first electrode of the plurality of electrodes of each vibrating-masses of the pair of vibrating-masses to provide the driving force to facilitate an in-plane periodic oscillatory motion of each of the vibrating-masses equally and oppositely along the first axis of the three orthogonal axes.

6. The system of claim 1, wherein the gyroscope system comprises a plurality of sensor systems, wherein the gyroscope controller is configured to generate the drive signal that is provided to the first electrode of a first sensor system of the plurality of sensor systems to facilitate the in-plane periodic oscillatory motion of the vibrating-mass associated with the first sensor system along the first axis of the three orthogonal axes and to generate the drive signal that is provided to the second electrode of a second sensor system of the plurality of sensor systems to facilitate the in-plane periodic oscillatory motion of the vibrating-mass associated with the second sensor system along the second axis of the three orthogonal axes, the gyroscope controller being further configured to generate the force-rebalance signal that is provided to each of the second electrode and the third electrode of the first sensor system and to the first electrode and the third electrode of the second sensor system to calculate the rotation of the gyroscope system about the three orthogonal axes.

7. The system of claim 6, wherein the plurality of sensor systems are arranged in a common planar arrangement.

8. The system of claim 6, wherein the plurality of sensor systems comprises:
   a first sensor system that is driven in the first axis to facilitate calculation of the rotation of the gyroscope system about the second axis and the third axis via the gyroscope controller;
   a second sensor system that is driven in the second axis to facilitate calculation of the rotation of the gyroscope system about the first axis and the third axis via the gyroscope controller; and
   a third sensor system that is driven in the third axis to facilitate calculation of the rotation of the gyroscope system about the first axis and the second axis via the gyroscope controller.

9. The system of claim 8, wherein the gyroscope controller is configured to calculate the rotation of the gyroscope system about the first axis via the respective second and third sensor systems differentially, to calculate the rotation of the gyroscope system about the second axis via the respective first and third sensor systems differentially, and to calculate the rotation of the gyroscope system about the third axis via the respective second and third sensor systems differentially.

10. The system of claim 8, wherein the gyroscope controller is configured to alternately change the axis along which each of the first, second, and third sensor systems is driven via the drive signal in each of a plurality of time periods to alternately calibrate the first, second, and third sensor systems based on differential calculations of the rotation of the gyroscope system about a given one of the orthogonal axes in two of the plurality of time periods for each of the first, second, and third sensor systems.

11. A method for measuring rotation about each of three orthogonal axes via a gyroscope system, the method comprising:
providing a drive signal to a first electrode to provide a driving force to a vibrating-mass along a first axis of the three orthogonal axes during a first time period;
providing a first force-rebalance signal to a second electrode to provide a first force-rebalance to the vibrating-mass in a second axis of the three orthogonal axes during the first time period to calculate a rotation of the gyroscope system about the second axis based on the first force-rebalance signal;
providing a second force-rebalance signal to a third electrode to provide a second force-rebalance to the vibrating-mass in a third axis of the three orthogonal axes during the first time period to calculate a rotation of the gyroscope system about the third axis based on the second force-rebalance signal;
providing the drive signal to the second electrode to provide the driving force to the vibrating-mass along the second axis during a second time period; and
providing the first force-rebalance signal to the first electrode to provide the first force-rebalance to the vibrating-mass in the first axis during the second time period to calculate a rotation of the gyroscope system about the first axis based on the first force-rebalance signal.

12. The method of claim 11, further comprising providing the second force-rebalance signal to the third electrode to provide the second force-rebalance to the vibrating-mass in the third axis during the second time period to calculate the rotation of the gyroscope system about the third axis based on the second force-rebalance signal.

13. The method of claim 12, wherein providing the second force-rebalance signal to the third electrode comprises differentially calculating the rotation of the gyroscope system about the third axis based on the second force-rebalance signal in the first and second time periods to calibrate the gyroscope system with respect to the calculation of the rotation of the gyroscope system about the third axis based on the second force-rebalance signal.

14. The method of claim 11, further comprising:
providing the drive signal to the third electrode to provide the driving force to the vibrating-mass along the third axis during a third time period;
providing the first force-rebalance signal to the first electrode to provide the first force-rebalance to the vibrating-mass in the first axis during the third time period to calculate the rotation of the gyroscope system about the first axis based on the first force-rebalance signal; and
providing the second force-rebalance signal to the second electrode to provide the second force-rebalance to the vibrating-mass in the second axis during the third time period to calculate the rotation of the gyroscope system about the second axis based on the second force-rebalance signal.

15. The method of claim 11, wherein the vibrating-mass is a first vibrating-mass associated with a first sensor system, wherein the drive signal is a first drive signal, the method further comprising:
providing a second drive signal to a fourth electrode to provide a second driving force to a second vibrating-mass associated with a second sensor system along the second axis during the first time period;
providing a third force-rebalance signal to a fifth electrode to provide a third force-rebalance to the second vibrating-mass in the first axis during the first time period to calculate the rotation of the gyroscope system about the first axis based on the third force-rebalance signal;
providing a fourth force-rebalance signal to a sixth electrode to provide a fourth force-rebalance to the second vibrating-mass in the third axis during the first time period to calculate the rotation of the gyroscope system about the third axis based on the fourth force-rebalance signal;
providing the second drive signal to the fourth electrode to provide the driving force to the second vibrating-mass along the first axis during the second time period; and
providing the third force-rebalance signal to the fifth electrode to provide the third force-rebalance to the second vibrating-mass in the second axis during the second time period to calculate the rotation of the gyroscope system about the second axis based on the third force-rebalance signal.

16. A gyroscope system comprising:
a first sensor system comprising a first vibrating-mass and a first set of electrodes arranged to provide a first driving force in a first axis of three orthogonal axes, a first force-rebalance in a second axis of the three orthogonal axes, and a second force-rebalance in a third axis of the three orthogonal axes to the first vibrating-mass;
a second sensor system comprising a second vibrating-mass and a second set of electrodes arranged to provide a second driving force in the second axis, a third force-rebalance in the first axis, and a fourth force-rebalance in the third axis to the second vibrating-mass; and
a gyroscope controller configured to generate a first drive signal and a second drive signal that are provided to the first and second sets of electrodes, respectively, to provide respective first and second driving forces to facilitate in-plane periodic oscillatory motion of the first and second vibrating-masses along the respective first and second axes, to generate first force-rebalance signals that are alternately provided to each of the electrodes of the first set of electrodes associated with the second and third axes to alternately calculate a rotation of the gyroscope system about the respective second and third axes, and to generate second force-rebalance signals that are alternately provided to each of the second set of electrodes associated with the first and third axes to alternately calculate the rotation of the gyroscope system about the respective first and third axes.

17. The system of claim 16, further comprising a third sensor system comprising a third vibrating-mass and a third set of electrodes arranged to provide a third driving force in the third axis, a fifth force-rebalance in the first axis, and a sixth force-rebalance in the second axis to the third vibrating-mass, wherein the gyroscope controller is further configured to generate a third drive signal that is provided to the third set of electrodes to provide a third driving force to facilitate in-plane periodic oscillatory motion of the third vibrating-mass along the third axis, to generate third force-rebalance signals that are provided to the third set of electrodes to calculate a rotation of the gyroscope system about the respective first and second axes.

18. The system of claim 16, wherein the gyroscope controller is configured to alternately change the axis along which each of the first and second sensor systems is driven via the respective first and second drive signals in each of a plurality of time periods and to alternately change the axes to which each of the first and second force-rebalance signals are provided to calculate the rotation of the gyroscope system about the respective other of the three-orthogonal axes.

19. The system of claim 16, wherein the gyroscope controller is configured to alternately change the axis along which each of the each of the first and second sensor systems is driven via the respective first and second drive signals in each of a plurality of time periods to alternately calibrate the first and second sensor systems based on differential calculations of the rotation of the gyroscope system about a given one of the orthogonal axes in two of the plurality of time periods for each of the first, second, and third sensor systems.

20. The system of claim 16, wherein the first and second sensor systems are arranged in a common planar arrangement.

\* \* \* \* \*